(12) United States Patent
Seki et al.

(10) Patent No.: US 10,781,554 B2
(45) Date of Patent: Sep. 22, 2020

(54) PROCESSING DEVICE, SHEET MANUFACTURING APPARATUS, PROCESSING METHOD, AND SHEET MANUFACTURING METHOD

(71) Applicant: SEIKO EPSON CORPORATION, Tokyo (JP)

(72) Inventors: Shunichi Seki, Nagano (JP); Hiroki Kurata, Nagano (JP); Hiroshi Tanaka, Nagano (JP); Seiichi Taniguchi, Nagano (JP); Kaneo Yoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 15/959,406

(22) Filed: Apr. 23, 2018

(65) Prior Publication Data
US 2018/0305869 A1 Oct. 25, 2018

(30) Foreign Application Priority Data

Apr. 24, 2017 (JP) ................................. 2017-085121

(51) Int. Cl.
*D21B 1/32* (2006.01)
*D21C 5/02* (2006.01)
*D21F 9/02* (2006.01)

(52) U.S. Cl.
CPC ............ *D21B 1/325* (2013.01); *D21C 5/027* (2013.01); *D21F 9/02* (2013.01); *Y02W 30/646* (2015.05)

(58) Field of Classification Search
None
See application file for complete search history.

(56) References Cited

U.S. PATENT DOCUMENTS

| 2002/0011030 A1* | 1/2002 | Williams ................. B24B 1/00 51/303 |
| 2010/0229889 A1 | 9/2010 | Shrader |
| 2012/0206546 A1 | 8/2012 | Shrader |

FOREIGN PATENT DOCUMENTS

| EP | 2230045 A1 | 9/2010 |
| JP | 2000-284657 A | 10/2000 |

* cited by examiner

*Primary Examiner* — Dennis R Cordray
(74) *Attorney, Agent, or Firm* — Global IP Counselors, LLP

(57) ABSTRACT

A processing device, a sheet manufacturing apparatus, a processing method, and a sheet manufacturing method that suppress damage to a substrate when removing color material from the substrate, and are useful for recycling the substrate after color material is removed, are provided. A processing device has a color material removal device including at least one discharge nozzle configured to discharge particles containing cellulose to a substrate holding color material, and remove the color material from the substrate. The color material removal device preferably has a double-walled conduit construction having an internal conduit and an external conduit in which the internal conduit is inserted, at least one of an opening to the internal conduit and an opening to the external conduit functioning as the discharge nozzle.

19 Claims, 11 Drawing Sheets

PROCESSING DEVICE, SHEET MANUFACTURING APPARATUS, PROCESSING METHOD, AND SHEET MANUFACTURING METHOD

BACKGROUND

1. Technical Field

The present invention relates to a processing device, a sheet manufacturing apparatus, a processing method, and a sheet manufacturing method.

2. Related Art

As concerns about the environment and environmental awareness have increased, there is growing interest in not only reducing the amount of paper (recording media) that is used in the workplace, but also in recycling and remanufacturing paper in the workplace.

JP-A-2000-284657, for example, describes a method of removing the recorded layer from the surface of a recorded (used) recording medium by spraying the recorded layer that was formed by toner or ink on the surface of paper or other recording medium with a blasting grit, and then remanufacturing a recording medium. Examples of materials that may be used as the blasting grit (material) in this method include sand, metal grit, glass grit, ceramic grit, walnut shell grit, ice particles, thermoplastic resin grit such as polyester or nylon particles, and thermoset resin grit made from melamine resin, phenol resin, alkyd resin, or urea formaldehyde resin (UF).

However, when the recorded layer is sprayed with a blast grit in the recording media recycling method described in JP-A-2000-284657, the blast grit may penetrate parts of the recording medium where a recorded layer is not formed. In this case, blasting grit that becomes embedded in the recording medium interferes with recycling the recording medium. Furthermore, because the blasting grit is harder than the recording medium, the blasting grit may damage the recording medium when the grit hits the recording medium.

SUMMARY

An objective of the present invention is to provide a processing device, a sheet manufacturing apparatus, a processing method, and a sheet manufacturing method that suppress damage to a substrate when removing color material from a substrate, and are useful for recycling the substrate after color material is removed.

The present invention is directed to solving at least part of the foregoing problem, and may be embodied as described below.

A processing device according to an aspect of the invention has a color material removal device having at least one discharge nozzle configured to discharge particles containing cellulose to a substrate holding color material, and remove the color material from the substrate.

Thus comprised, a powder of particles containing cellulose is used to remove color material from a substrate. As described further below, because the substrate contains cellulose, damage to the substrate caused by the particles striking the substrate when removing the color material can be suppressed. Furthermore, because color material is removed when the substrate is recycled and the substrate therefore contains no impurities, the substrate can be supplied to the next process (such as a sheet manufacturing process) in a form that is convenient for recycling. Furthermore, even if some of the cellulose (particles) used to remove the color material remains in the substrate during recycling, any residual cellulose will not be an impurity if the substrate was originally made with cellulose, and residual particles have no adverse effect on recycling.

Preferably in a processing device according to another aspect of the invention, the color material removal device is a double-walled conduit construction having an internal conduit and an external conduit in which the internal conduit is inserted, at least one of an opening to the internal conduit and an opening to the external conduit functioning as the discharge nozzle.

Thus comprised, the opening to the internal conduit or the opening to the external conduit can be used as the discharge nozzle, and the other of the two openings can be used for another application (such as discharging a gas or suctioning powder particles).

Further preferably in a processing device according to another aspect of the invention, an opening to the internal conduit functions as the discharge nozzle; and a gas is discharged from an opening to the external conduit.

Thus comprised, the gas discharged from the external conduit functions as an air curtain surrounding the particles discharged from the internal conduit. As a result, the particles can be prevented from dispersing before the particles reach the color material on the substrate, and as a result the particles can be made to strike a relatively confined area of the substrate with great force. This impact of the particles can quickly and efficiently remove the color material from the substrate.

Further preferably in a processing device according to another aspect of the invention, an opening to the external conduit functions as the discharge nozzle; and the particles are suctioned by the opening in the internal conduit.

This suction can prevent the particles from dispersing before the particles reach the color material on the substrate, and as a result the particles can be made to strike a relatively confined area of the substrate with great force. This impact of the particles can quickly and efficiently remove the color material from the substrate. This impact of the particles can quickly and efficiently remove the color material from the substrate. Dispersal of particles after the particles strike the substrate and color material can also be prevented.

Further preferably in a processing device according to another aspect of the invention, an opening to the internal conduit and an opening to the external conduit both function as the discharge nozzle.

Thus comprised, areas on the substrate that are preferably bombarded by particles from the internal conduit to remove color material can be struck by particles from the internal conduit, and areas that are preferably bombarded by particles from the external conduit to remove color material can be struck by particles from the external conduit.

Further preferably in a processing device according to another aspect of the invention, the color material removal device has a plurality of discharge nozzles configured to discharge the particles in different directions.

This configuration further improves the efficiency of color material removal by particles discharged from different directions hitting the color material on the substrate.

Further preferably in a processing device according to another aspect of the invention, the particles discharged from the nozzles differ by at least one of particle diameter and moisture content.

When removing color material, this configuration can bombard the color material on the substrate with multiple types of particles having different properties. For example, color material on the substrate that is preferably removed by particles of a first type of multiple types of particles can be struck by particles of the first type, and color material on the substrate that is preferably removed by particles of a second of multiple types of particles can be removed by particles of the second type.

Further preferably, a processing device according to another aspect of the invention also has a housing configured to be kept airtight and having the discharge nozzle disposed inside the housing; and removes the color material inside the housing.

Thus comprised, particles discharged from the discharge nozzle, and color material that is removed by the particles, can be prevented from dispersing to the surrounding area.

Further preferably in a processing device according to another aspect of the invention, the average diameter of the particles is greater than or equal to 0.1 μm and less than or equal to 50 μm.

Thus comprised, the particles can function desirably as a removal powder for removing color material from a substrate.

Further preferably in a processing device according to another aspect of the invention, the moisture content of the particles is greater than or equal to 5% and less than or equal to 20%.

Thus comprised, because the mass of a powder containing moisture increases, the kinetic energy of the particles can be increased, and the particles can remove color material more efficiently.

Further preferably, a processing device according to another aspect of the invention also has a moving device configured to move the discharge nozzle and the substrate relative to each other.

Thus comprised, the nozzles can be focused on the color material regardless of where the color material is located on the substrate. The particles can then be discharged directly to the color material, and can remove the color material from the substrate.

Further preferably, a processing device according to another aspect of the invention also has a collection device configured to collect the particles and the color material after the color material is removed.

Thus comprised, particles and color material can be prevented from being left on the substrate.

Further preferably, a processing device according to another aspect of the invention also has a separator configured to separate the collected particles and the color material.

Thus comprised, particles that can be used again, and color material that can be discarded, can be separated.

Further preferably, a processing device according to another aspect of the invention also has a flow path configured to return the collected particles to the color material removal device; the color material removal device reusing the particles returned from the flow path to remove the color material.

Thus comprised, wastefully discarding particles that can be used again can be prevented.

Further preferably in a processing device according to another aspect of the invention, the color material removal device is configured to discharge a refrigerant with the particles.

Heat is produced when the particles strike the color material, but heat generation can be suppressed by the coolant (refrigerant). As a result, the color material can be prevented from being melted by the heat and binding with the substrate, and color material can be removed more efficiently. Cooling can also make the color material (resin) brittle, further improving the efficiency of color material removal. Furthermore, the difference in the coefficients of thermal expansion of the color material and the cellulose (fiber) when cooled can also be used to further improve efficiency removing color material.

Further preferably, a processing device according to another aspect of the invention also has a color material detector configured to detect color material on the substrate.

This configuration enables focusing the discharge of particles from the discharge nozzle of the color material removal device on the color material, and thereby enables quickly removing color material from the substrate.

Further preferably, a processing device according to another aspect of the invention also has an ejection area decision device configured to determine, based on a detection result from the color material detector, an area on the substrate to which to discharge the particles.

This configuration can efficiently remove color material from a substrate.

Another aspect of the invention is a sheet manufacturing apparatus including a processing device according to the invention.

Thus comprised, a powder of particles containing cellulose is used to remove color material from a substrate. As described further below, because the substrate contains cellulose, damage to the substrate caused by the particles striking the substrate when removing the color material can be suppressed. Furthermore, because color material is removed when the substrate is recycled and the substrate therefore contains no impurities, the substrate can be supplied to the next process (such as a sheet manufacturing process) in a form that is convenient for recycling. Sheets can then be recycled (manufactured) using substrate material from which color material has been removed. Furthermore, even if some of the cellulose (particles) used to remove the color material remains in the substrate during recycling, any residual cellulose will not be an impurity if the substrate was originally made with cellulose, and residual particles have no adverse effect on recycling the substrate.

Another aspect of the invention is a processing method including a color material removal process of discharging particles containing cellulose to a substrate holding a color material, and removing the color material from the substrate.

Thus comprised, a powder of particles containing cellulose is used to remove color material from a substrate. As described further below, because the substrate contains cellulose, damage to the substrate caused by the particles striking the substrate when removing the color material can be suppressed. Furthermore, because color material is removed when the substrate is recycled and the substrate therefore contains no impurities, the substrate can be supplied to the next process (such as a sheet manufacturing process) in a form that is convenient for recycling. Furthermore, even if some of the cellulose (particles) used to remove the color material remains in the substrate during recycling, any residual cellulose will not be an impurity if the substrate was originally made with cellulose, and residual particles have no adverse effect on recycling.

Another aspect of the invention is a sheet manufacturing method including: a color material removal process of discharging particles containing cellulose to a substrate holding a color material, and removing the color material from the substrate; and manufacturing a sheet from the substrate after the color material is removed.

Thus comprised, a powder of particles containing cellulose is used to remove color material from a substrate. As described further below, because the substrate contains cellulose, damage to the substrate caused by the particles striking the substrate when removing the color material can be suppressed. Furthermore, because color material is removed when the substrate is recycled and the substrate therefore contains no impurities, the substrate can be supplied to the next process (such as a sheet manufacturing process) in a form that is convenient for recycling. Sheets can then be recycled (manufactured) using substrate material from which color material has been removed. Furthermore, even if some of the cellulose (particles) used to remove the color material remains in the substrate during recycling, any residual cellulose will not be an impurity if the substrate was originally made with cellulose, and residual particles have no adverse effect on recycling the substrate.

Other objects and attainments together with a fuller understanding of the invention will become apparent and appreciated by referring to the following description and claims taken in conjunction with the accompanying drawings.

BRIEF DESCRIPTION OF TEE DRAWINGS

DESCRIPTION OF EMBODIMENTS

A processing device, a sheet manufacturing apparatus, a processing method, and a sheet manufacturing method according to the invention are described below with reference to the accompanying figures.

The processing device 1 according to this embodiment has a color material removal device 7. The color material removal device 7 has at least one nozzle for ejecting particles RM containing cellulose to a feedstock M1 (substrate) containing a color material CM, and at least one nozzle 731 for removing the color material CM from the feedstock M1 (substrate). This method is implemented by the processing device 1.

Thus comprised, a powder of particles RM containing cellulose is used to remove color material CM from the feedstock M1. As described further below, because the feedstock M1 contains cellulose, damage to the feedstock M1 caused by the particles RM striking the feedstock M1 when removing the color material CM can be suppressed. Furthermore, because color material CM is removed when the feedstock M1 is recycled and the substrate therefore contains no impurities, the feedstock M1 can be supplied to the next process (such as a sheet S manufacturing process) in a form that is convenient for making new sheets. Furthermore, even if some of the particles RM (cellulose) used to remove the color material CM remain in the recycled feedstock M1, any residual particles RM will not be an impurity if the feedstock M1 was originally made with cellulose, and the residual particles RM have no adverse effect on recycling.

The sheet manufacturing apparatus 100 of the invention includes the processing device 1 of the invention. The sheet manufacturing method of the invention includes a color material removal process of spraying a feedstock M1 (substrate) containing a color material CM with particles RM containing cellulose to remove the color material CM from the feedstock M1 (substrate), and then manufactures sheets S from the feedstock M1 (substrate) from which the color material CM was removed.

The invention thus comprised can take advantage of the features of the processing device 1 (processing method) described above while additionally manufacturing (regenerating) sheets S from the feedstock M1 from which the color material CM was removed.

Embodiment 1

Figure 1:
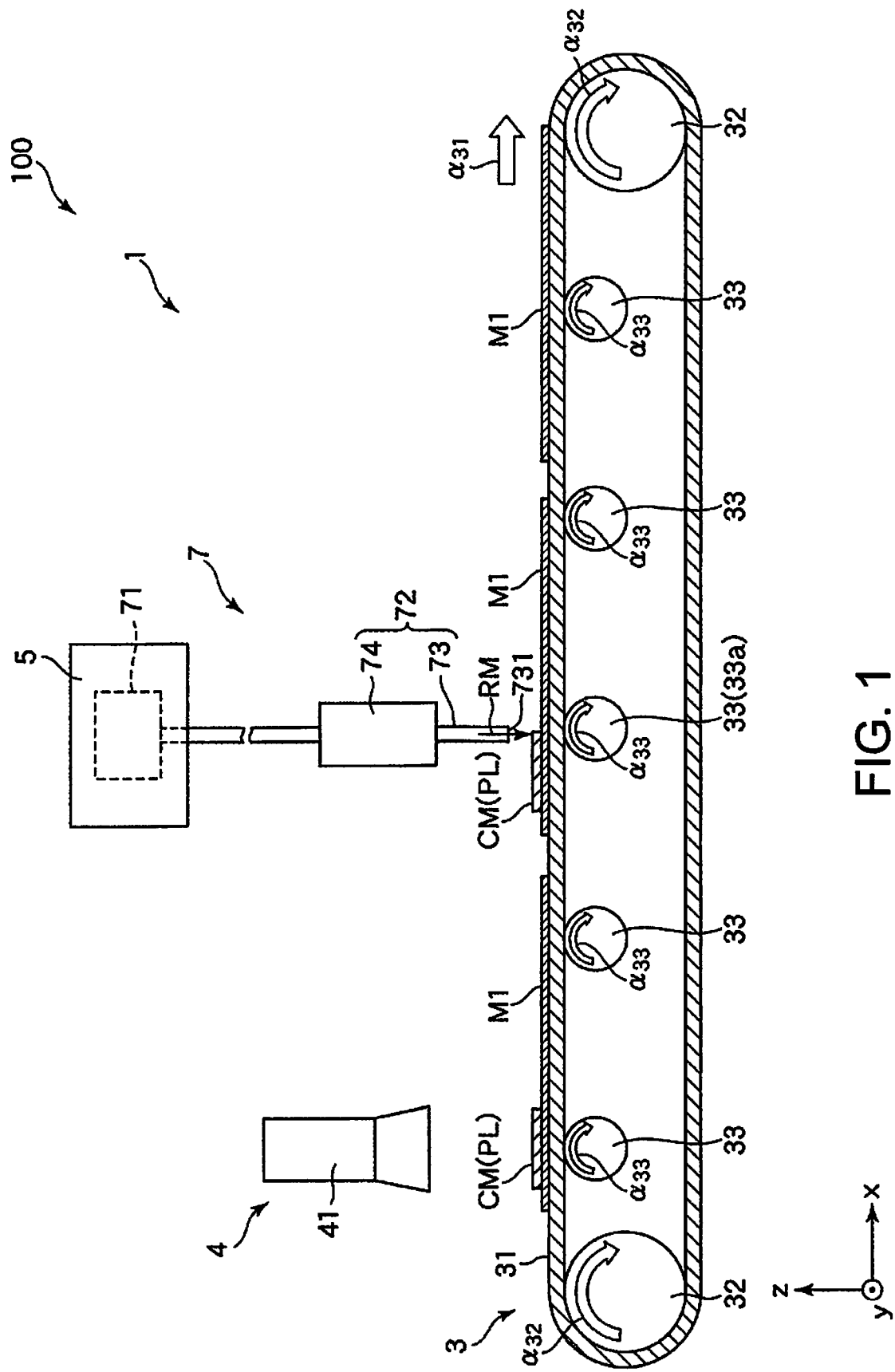
FIG. 1 is a side view schematically illustrating the configuration of the upstream side (processing device of the invention) of a sheet manufacturing apparatus according to a first embodiment of the invention.

FIG. 1 is a side view schematically illustrating the configuration of the upstream side (processing device of the invention) of a sheet manufacturing apparatus according to a first embodiment of the invention.

Figure 2:
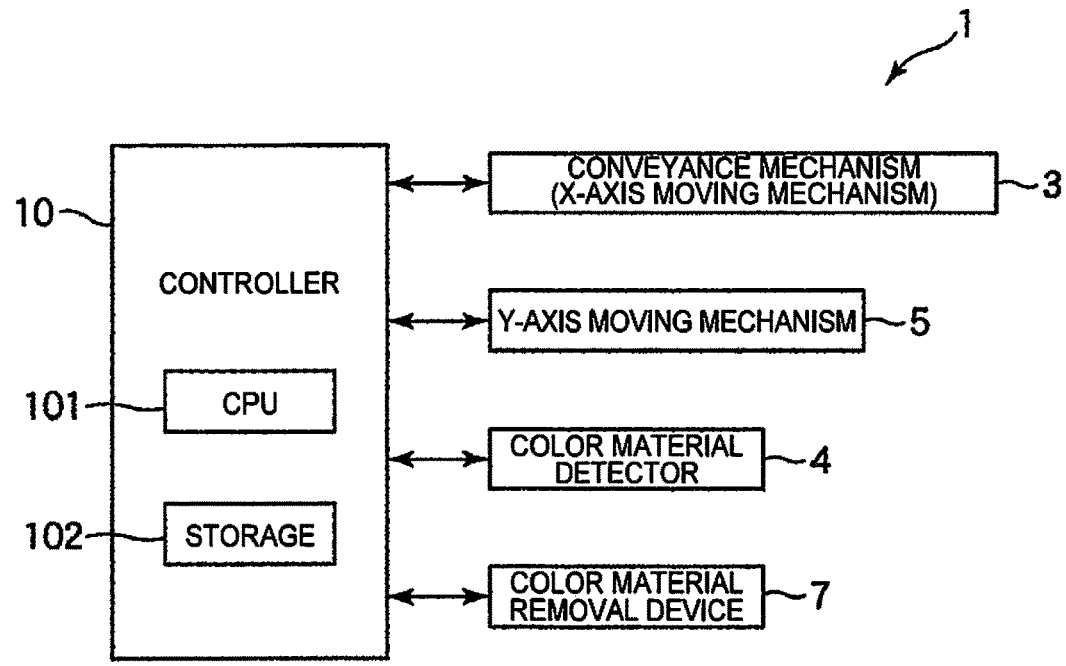
FIG. 2 is a block diagram showing main parts of the processing device shown in FIG. 1.

FIG. 2 is a block diagram showing main parts of the processing device shown in FIG. 1.

Figure 3:
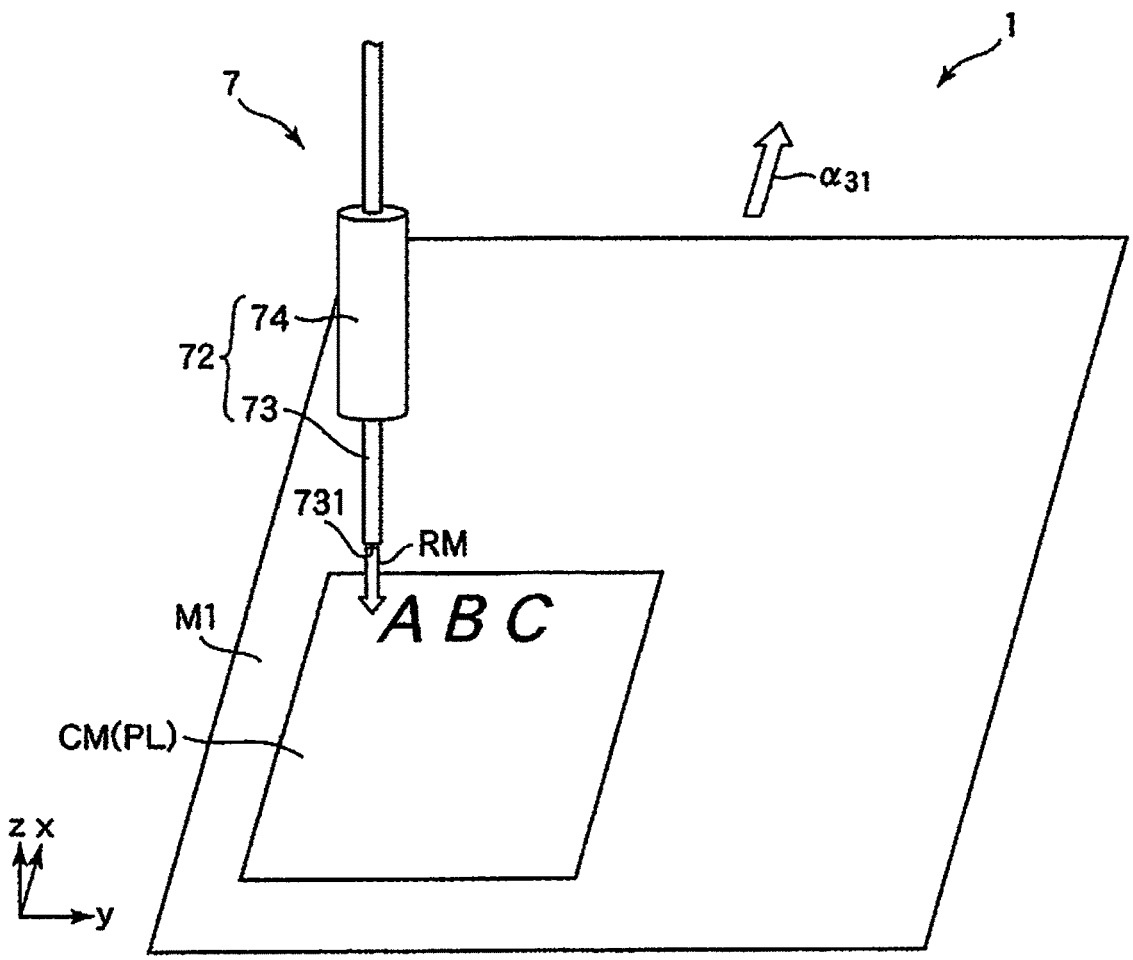
FIG. 3 is an oblique view of the color material removal device of the processing device shown in FIG. 1.

FIG. 3 is an oblique view of the color material removal device of the processing device shown in FIG. 1.

Figure 4:
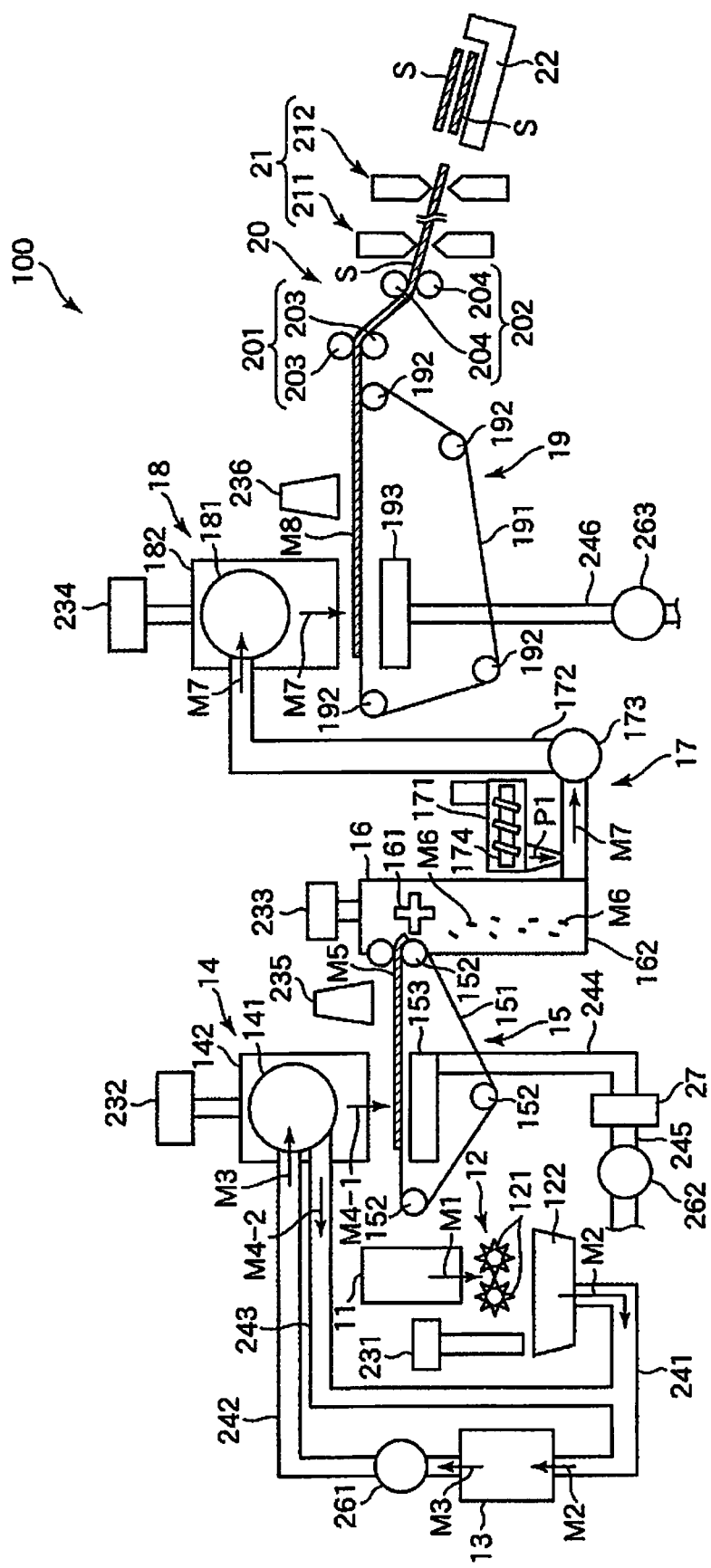
FIG. 4 is a side view schematically illustrating the configuration on the downstream side of a sheet manufacturing apparatus according to the invention (first embodiment of the invention).

FIG. 4 is a side view schematically illustrating the configuration on the downstream side of a sheet manufacturing apparatus according to the invention (first embodiment of the invention).

Figure 5:
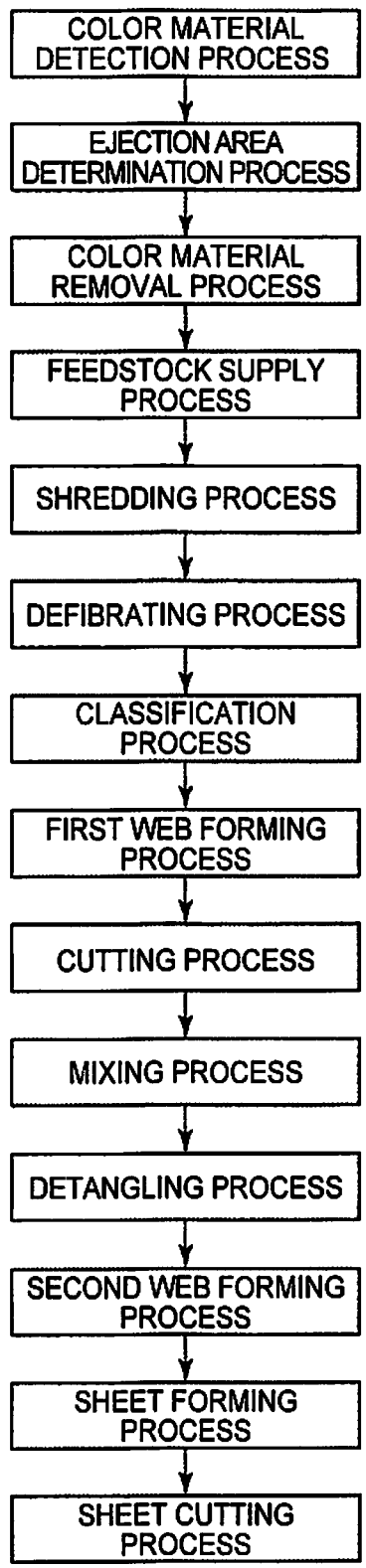
FIG. 5 is a flow chart showing the sequence of steps executed by the sheet manufacturing apparatus according to the invention (first embodiment).

FIG. 5 is a flow chart showing the sequence of steps executed by the sheet manufacturing apparatus according to the invention (first embodiment).

Note that for convenience below, embodiments of the invention are described with reference to three mutually perpendicular axes, an X-axis, Y-axis, and Z-axis. The x-y plane defined by the X-axis and Y-axis is horizontal, and the Z-axis is perpendicular to the x-y plane. The direction indicated by the arrows on the axes is referred to as the forward direction, and the opposite direction as the reverse. In addition, in FIG. 1, FIG. 3, and FIG. 4 (and in FIG. 8 to FIG. 13), the side at the top is referred to as up or above; and the side at the bottom is referred to as down or below. In addition, in FIG. 1 and FIG. 4 (and in FIG. 8 to FIG. 13), the left side is referred to as the left or the upstream side; and the right side is referred to as the right or the downstream side.

As shown in FIG. 1, the sheet manufacturing apparatus 100 has a processing device 1 on the upstream side. As shown in FIG. 2, the processing device 1 has a conveyance mechanism 3 (X-axis moving mechanism), a Y-axis moving mechanism 5, a color material detector 4, a color material removal device 7, and a controller 10.

As shown in FIG. 4, the sheet manufacturing apparatus 100 has, on the downstream side, a feedstock supply device 11, a shredder 12, a defibrator 13, a classifier 14, a first web forming device 15, a cutter 16, a mixing device 17, a detangler 18, a second web forming device 19, a sheet forming device 20, a paper cutter 21, and a stacker 22. The sheet manufacturing apparatus 100 also has wetting unit 231, wetting unit 232, wetting unit 233, and wetting unit 234.

The controller 10 may be configured to control the operation of parts of the feedstock supply device 11, or it may be configured to control the operation of the remaining parts of the sheet manufacturing apparatus 100 other than the parts of the processing device 1. When the controller 10 controls the operation of parts of the controller 10, the sheet manufacturing apparatus 100 may have a separate control means for controlling operation of the remaining parts.

Note that as shown in FIG. 2, the controller 10 has a CPU (central processing unit) 101, and storage 102. The storage 102 stores data and control programs the CPU 101 executes to control the operation of parts.

As shown in FIG. 5, the sheet manufacturing method in this embodiment of the invention includes a color material detection process, an ejection area determination process, a color material removal process, a feedstock supply process, a shredding process, a defibrating process, a classification process, a first web forming process, a cutting process, a mixing process, a detangling process, a second web forming process, a sheet forming process, and a sheet cutting process. The sheet manufacturing apparatus 100 can execute these processes sequentially.

Of these processes, the processes executed by the processing device 1 (preprocessing steps) are the color material detection process, the ejection area determination process, and the color material removal process.

The configuration of parts of the sheet manufacturing apparatus 100 is described below.

The configuration on the downstream side of the sheet manufacturing apparatus 100 is described first, and the configuration on the upstream side of the sheet manufacturing apparatus 100, that is, the configuration of the processing device 1, is described next.

The feedstock supply device 11 is the part that executes the feedstock supply process (see FIG. 5) supplying feedstock M1 (substrate) to the shredder 12. The feedstock M1 is a sheet material containing fiber (cellulose fiber), and is the material to which the processing device 1 applies the color material removal process to remove color material CM.

Note that the cellulose fiber may be any fibrous material containing mainly cellulose (narrowly defined cellulose) as a chemical compound, and in addition to cellulose (narrowly defined cellulose) may include hemicellulose or lignin. The form of the feedstock M1 is not specifically limited, and it may be woven cloth or non-woven cloth. The feedstock M1 may also be recycled paper manufactured (regenerated) by defibrating recovered paper, or synthetic Yupo paper (R), and does not need to be recycled paper.

The shredder 12 is the part that executes the shredding process (see FIG. 5) of shredding the feedstock M1 supplied from the feedstock supply device 11 in air (ambient air). The shredder 12 has a pair of shredder blades 121 and a chute (hopper) 122.

By turning in mutually opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can easily catch the shreds M2 that are shredded and dropped by the shredder blades 121.

Above the chute 122, a wetting unit 231 is disposed beside the pair of shredder blades 121. The wetting unit 231 wets the shreds M2 in the chute 122. This wetting unit 231 has a filter (not shown in the figure) containing water, and is configured as a heaterless humidifier (or heated humidifier) that supplies a moist stream of air to the shreds M2 by passing air through the filter. By wet air being supplied to the shreds M2, shreds M2 sticking to the chute 122 due to static electricity can be suppressed.

The chute 122 connects to the defibrator 13 through a conduit (flow channel) 241. The shreds M2 collected in the chute 122 passes through the conduit 241 and are conveyed to the defibrator 13.

The defibrator 13 is the part that executes the defibrating process (see FIG. 5) that defibrates the shreds M2 in a dry process in air. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

The defibrator 13 in this embodiment of the invention, for example, is configured as an impeller mill having a rotor that turns at high speed, and a liner disposed around the rotor. Shreds M2 introduced to the defibrator 13 are defibrated between the rotor and the liner.

The defibrator 13, by rotation of the rotor, produces an air flow (current) from the shredder 12 to the classifier 14. As a result, shreds M2 can be suctioned from the conduit 241 to the defibrator 13. In addition, after the defibration process, the defibrated material M3 can be fed through another conduit 242 to the classifier 14.

A blower 261 is disposed in the conduit 242. The blower 261 is an air flow generator that produces a flow of air to the classifier 14. Conveyance of the defibrated material M3 to the classifier 14 is thereby promoted.

The classifier 14 is the part that executes the classification process (see FIG. 2) of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S downstream.

The average length of the fibers is preferably greater than or equal to 100 μm and less than or equal to 10 mm.

The second screened material M4-2 includes, for example, fiber that has not been sufficiently defibrated, and excessively agglomerated (clumped) defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit (flow path) 243 connected to the drum 141. The end of the conduit 243 on the opposite end (downstream end) as the drum 141 is connected to another conduit 241. The second screened material M4-2 that past through the conduit 243 merges with the shreds M2 inside the conduit 241, and is introduced with the shreds M2 to the defibrator 13. As a result, the second screened material M4-2 is returned to the defibrator 13 and past through the defibrating process with the shreds M2.

The first screened material M4-1 from the drum 141 is dispersed while dropping through air, and descends toward the first web forming device 15 (separator). The first web forming device 15 is the part that executes a first web forming process (see FIG. 5) forming a first web M5 from the first screened material M4-1. The first web forming device 15 includes a mesh belt (separation belt) 151, three tension rollers 152, and a suction unit (suction mechanism) 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screened material M4-1 may also contain dust, color material CM, and other material. Dust, for example, may be produced by shredding and defibration. Such dust and color material CM is later recovered in the storage hopper 27 described below.

The suction unit 153 suctions air from below the mesh belt 151. As a result, dust and color material CM that has past through the mesh belt 151 can be suctioned together with the air.

The suction unit 153 is connected to a storage hopper 27 (recovery device) through another conduit (flow path) 244. Dust and color material CM suctioned by the suction unit 153 is captured by the storage hopper 27.

Another conduit (flow path) 245 is also connected to the storage hopper 27. A blower 262 is disposed to the conduit 245. Operation of the blower 262 produces suction in the suction unit 153. This promotes formation of the first web M5 on the mesh belt 151. Dust and color material CM has been removed from the material forming the first web M5. Operation of the blower 262 causes the dust and color material CM to pass through the conduit 244 and reach the storage hopper 27.

The housing 142 is connected to a wetting unit 232. Like the wetting unit 231 described above, the wetting unit 232 is a heaterless humidifier. As a result, wet air is supplied into the housing 142. This wet air moistens the first screened material M4-1, and as a result can suppress sticking of the first screened material M4-1 to the inside walls of the housing 142 due to static electricity.

Another wetting unit 235 is disposed downstream from the classifier 14. This wetting unit 235 is configured as an ultrasonic humidifier that mists water. As a result, moisture can be supplied to the first web M5, and the moisture content of the first web M5 can thereby be adjusted. This adjustment can also suppress sticking of the first web M5 to the mesh belt 151 due to static electricity. As a result, the first web M5 easily separates from the mesh belt 151 at the tension roller 152 from where the mesh belt 151 returns to the upstream side.

On the downstream side of the wetting unit 235 is a cutter 16. The cutter 16 is a part that executes a cutting process (see FIG. 5) of cutting the first web M5 that has separated from the mesh belt 151.

The cutter 16 has a propeller 161 that is rotationally supported, and a housing 162 that houses the propeller 161. The first web M5 is cut into pieces as it is fed into the rotating propeller 161. The cut first web M5 forms segments M6. The segments M6 then drop down in the housing 162.

The housing 162 is connected to another wetting unit 233. Like the wetting unit 231 described above, the wetting unit 233 is a heaterless humidifier. As a result, wet air is supplied into the housing 162. This wet air suppresses sticking of the segments M6 to the propeller 161 and to the inside walls of the housing 162 due to static electricity.

A mixing device 17 is disposed on the downstream side of the cutter 16. The mixing device 17 is the part that executes a mixing process (see FIG. 5) of mixing the segments M6 with resin P1. The mixing device 17 includes a resin supply device 171, a conduit (flow path) 172, and a blower 173.

The conduit 172 connects to the housing 162 of the cutter 16 and the housing 182 of the detangler 18, and is a flow path through which a mixture M7 of the segments M6 and resin P1 passes.

The resin supply device 171 connects to the conduit 172. The resin supply device 171 has a screw feeder 174. By rotationally driving the screw feeder 174, the resin P1 can be supplied in powder or particle form to the conduit 172. The resin P1 supplied to the conduit 172 is mixed with the segments M6, forming the mixture M7.

Note that the resin P1 bonds fibers together in a downstream process, and may be a thermoplastic resin or a thermosetting resin, but is preferably a thermoplastic resin. Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P1 may also be supplied from the resin supply device 171, including, for example, coloring agents for adding color to the fiber, anti-blocking agents for suppressing clumping of the fiber and clumping of the resin P1, and flame retardants for making the fiber and manufactured sheets difficult to burn. Compounds already incorporating such other additives with the resin P1 may also be supplied.

The blower 173 is disposed to the conduit 172 downstream from the resin supply device 171. The segments M6 and resin P1 are also mixed by the action of a rotating unit such as blades of the blower 173. The blower 173 is configured to produce an air current toward the detangler 18. This air current can also mix the segments M6 and resin P1 inside the conduit 172. As a result, the mixture M7 can be introduced to the detangler 18 as a uniform dispersion of the segments M6 and resin P1. The segments M6 in the mixture M7 are further detangled into smaller fibers while travelling through the conduit 172.

The detangler 18 is the part that executes the detangling process (see FIG. 5) that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. The mixture M7 is detangled in this process.

The mixture M7 that is detangled in the drum 181 is dispersed while dropping through air, and falls to the second web forming device 19 located below the drum 181. The second web forming device 19 is the part that executes the second web forming process (see FIG. 5) forming a second web M8 from the mixture M7. The second web forming device 19 includes a mesh belt (separation belt) 191, tension rollers 192, and a suction unit (suction mechanism) 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The suction unit 193 suctions air down from below the mesh belt 191. As a result, the mixture M7 can be pulled onto the mesh belt 191, and accumulation of the mixture M7 on the mesh belt 191 is thereby promoted.

Another conduit (flow path) 246 is connected to the suction unit 193. A blower 263 is also disposed to the conduit 246. Operation of the blower 263 produces suction in the suction unit 193.

Another wetting unit 234 is connected to the housing 182. Like the wetting unit 231 described above, the wetting unit 234 is a heaterless humidifier. As a result, wet air is supplied into the housing 182. By humidifying the inside of the housing 182 by adding wet air, sticking of the mixture M7 to the inside walls of the housing 182 due to static electricity can be suppressed.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. This adjustment can also suppress sticking of the second web M8 to the mesh belt 191 due to static electricity. As a result, the second web M8 easily separates from the mesh belt 191 at the tension roller 192 from where the mesh belt 191 returns to the upstream side.

Note that the amount of moisture (total moisture content) added by wetting unit 231 to wetting unit 236 is, for example, preferably greater than or equal to 0.5 parts by weight and less than or equal to 20 parts by weight per 100 parts by weight of the material before adding moisture.

A sheet forming device 20 is disposed downstream from the second web forming device 19. The sheet forming device 20 is the part that executes the sheet forming process (see FIG. 5) forming sheets S from the second web M8. This sheet forming device 20 includes a calender 201 and a heater 202.

The calender 201 comprises a pair of calender rolls 203, and the second web M8 can be compressed without heating (without melting the resin P1) by passing the second web M8 between the calender rolls 203. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 passing between the heat rollers 204. The combination of heat and pressure melts the resin P1 in the second web M8, and bonds fibers through the molten resin P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

A paper cutter 21 is disposed downstream from the sheet forming device 20. The paper cutter 21 is the part that executes the sheet cutting process (see FIG. 5) that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

Sheets S of a desired size are produced by the cutting action of the first cutter 211 and the second cutter 212. The sheets S are then conveyed further downstream and stacked in a stacker 22.

In this embodiment of the invention the feedstock M1 that is remanufactured into sheets S is recovered paper that was previously printed on. As a result, the feedstock M1 before being introduced to the feedstock supply device 11 has a recorded layer (printed layer) PL that was used to record information using black or color toner or ink, dyes, pigments, or other color material CM. See FIG. 1 and FIG. 3. When making new sheets S, as much of the color material CM as possible is preferably removed. As a result, high quality sheets S from which impurities such as color material CM have been removed can be produced.

A processing device 1 disposed on the upstream side of the sheet manufacturing apparatus 100 in this embodiment is therefore configured to remove color material CM from the feedstock M1. This processing device 1 is described below. The processing device 1 particularly improves the efficiency of removing color material CM when the color material CM is toner or ink.

As shown in FIG. 1, the processing device 1 has a conveyance mechanism 3, a Y-axis moving mechanism 5, a color material detector 4, a color material removal device 7, and a controller 10. Note that the processing device 1 is preferably disposed or connected to the feedstock supply device 11.

The conveyance mechanism 3 conveys the feedstock M1 downstream, that is, forward on the X-axis (main scanning direction). The conveyance mechanism 3 includes a glue belt 31, two tension rollers 32, and a plurality of idler rollers 33.

The glue belt 31 is an endless belt with a sticky surface. The sticky surface of the glue belt 31 holds the feedstock M1 firmly and stable during the color material detect ion process of the color material detector 4, and the color material removal process of the color material removal device 7. A plurality of feedstocks M1 can be loaded on the glue belt 31. The feedstocks M1 on the glue belt 31 may be oriented in the same direction, or not.

The two tension rollers 32 are disposed on the upstream end and the downstream end in the conveyance direction of the glue belt 31 with a gap therebetween, and the glue belt 31 is mounted on the tension rollers 32. Of the two tension rollers 32, one tension roller 32 is connected to a motor (not shown in the figure), and is a drive roller that turns in the direction of arrow α32 by driving the motor. The other tension roller 32 is a driven roller to which torque is transferred from the drive roller through the glue belt 31, and which turns in the same direction as the drive roller, that is, the direction of arrow α32. When the tension rollers 32 turn, the feedstock M1 on the glue belt 31 is conveyed in the conveyance direction α31.

By adjusting the speed of the drive roller, the conveyance mechanism 3 can also vary the conveyance speed of the feedstock M1.

A plurality of idler rollers 33 are disposed with a gap therebetween between the two tension rollers 32. Each idler roller 33 can turn in conjunction with driving the glue belt 31 in the same direction of rotation α33 as the direction of rotation of the tension rollers 32. The idler rollers 33 can prevent the glue belt 31 from sagging, and therefore enable conveying the feedstock M1 stably.

The Y-axis moving mechanism 5 supports the color material removal device 7 movably bidirectionally on the Y-axis (sub-scanning direction). The configuration of the Y-axis moving mechanism 5 is not specifically limited, and may be configured with a ball screw disposed parallel to the Y-axis, a motor as the drive source that rotates the ball screw, and a linear guide that guides the color material removal device 7 on the Y-axis in conjunction with rotation of the ball screw.

The conveyance mechanism 3 and Y-axis moving mechanism 5 can move the nozzle 731 of the color material removal device 7 and the feedstock M1 (substrate) relative to each other on the x-y plane. The processing device 1 (sheet manufacturing apparatus 100) thus comprises a moving means for moving the nozzle 731 of the color material removal device 7 and the feedstock M1 (substrate) relative to each other. As a result, regardless of the location of color material CM (recorded layer PL) on the feedstock M1, the nozzle 731 can be positioned opposite the color material CM. Particles RM can then be ejected from the nozzle 731 to the color material CM so that the particles RM strike the color material CM. Bombardment of the color material CM with the particles RM can remove the color material CM from the feedstock M1.

As shown in FIG. 1, the processing device 1 also has a color material detector 4 that detects the color material CM (recorded layer PL) on the feedstock M1 (substrate) before removing the color material CM. The color material detector 4 is a part that is disposed along the glue belt 31 for executing the color material detection process (see FIG. 5) to detect color material CM on the feedstock M1. Based on the detection result from the color material detector 4, that is, the location of the color material CM detected (extracted) by the color material detector 4, the controller 10 (ejection area decision device) determines the area on the feedstock M1 (substrate) to which to eject particles RM from the color material removal device 7.

The color material detector 4 in this example has an imaging device 41 embodied by a CCD (charge coupled device) camera. The imaging device 41 is disposed and secured facing down. As a result, when the feedstock M1 on the glue belt 31 passes directly below the imaging device 41, the imaging device 41 can take a gray scale picture of the feedstock M1. The captured image is then sent to the controller 10, which executes an imaging process extracting the location of the color material CM (recorded layer PL) on the feedstock M1. This imaging process is not specifically limited, but is preferably a digitizing process. A threshold is set, and image areas exceeding the threshold are determined to be areas where there is color material CM. The imaging area of the imaging device 41 is large enough to enable imaging the entire feedstock M1 if the feedstock M1 is directly below the imaging device 41.

Based on the detection result from the color material detector 4, that is, the location of the color material CM detected (extracted) by the color material detector 4, the processing device 1 can determine the area on the feedstock M1 (substrate) to which to eject particles RM from the color material removal device 7.

In this embodiment of the invention, the controller 10 (CPU 101) functions as an ejection area decision device, and executes the ejection area determination process (see FIG. 5). As a result, particles RM ejected from the nozzle 731 of the color material removal device 7 can be focused on the color material CM, and color material CM can be quickly removed from the feedstock M1.

As shown in FIG. 1, the color material removal device 7 is disposed above the glue belt 31 and downstream from the color material detector 4. The color material removal device 7 ejects the particles RM (cellulose) to the feedstock M1 (substrate) containing color material CM, and executes the color material removal process (see FIG. 5) that removes the color material CM from the feedstock M1 (substrate).

The color material removal device 7 has a holding tank 71. The holding tank 71 is a tank for holding the particles RM. When the holding tank 71 becomes empty, the holding tank 71 is replaced with another holding tank 71 holding a sufficient amount of particles RM.

The color material removal device 7 also has an ejector 72 for ejecting the particles RM to the feedstock M1. The ejector 72 includes a conduit 73 and a blower 74.

One end of the conduit 73 connects to the holding tank 71, and the opposite end is a nozzle 731 with the opening pointing down. Particles RM passing from the holding tank 71 through the conduit 73 are ejected from the nozzle 731. The velocity (ejection velocity) of the ejected particles RM is set appropriately to the size of the particles RM. The color material removal device 7 may be supported vertically on the Z-axis. This configuration enables adjusting the height of the nozzle 731 appropriately to the thickness of the feedstock M1.

A blower 74 is disposed along the length of the conduit 73. The blower 74 in this example can produce a downward stream of air at a pressure ranging from greater than or equal to 0.1 MPa and less than or equal to 0.5 MPa. As a result, the particles RM pass through the conduit 73 and can be desirably ejected from the nozzle 731. Some of the particles RM that is ejected will strike the color material CM on the surface of the feedstock M1, and color material CM that is embedded in the feedstock M1. Impact of the particles RM striking the color material CM can separate the color material CM from the feedstock M1. In this way, the particles RM is a removal powder for separating and removing the color material CM from the feedstock M1. More particularly, when the color material CM is toner or ink, the particles RM function as an excellent removal powder for removing the color material CM. The particles RM that is ejected includes particles RM that strike the color material CM, and particles RM that strike the feedstock M1 without hitting color material CM. In this case, some of the fiber in the feedstock M1 may also be removed. The decolorized feedstock M1 from which color material CM was removed is then conveyed to the feedstock supply device 11, and regenerated (manufactured) as a sheet S through the following processes. The sheets S are high quality sheets from which color material CM, which could become an impurity in the remanufactured sheet, has been removed.

As described above, particles RM containing cellulose are used to remove color material CM from the feedstock M1. Because the feedstock M1 contains cellulose, damage to the feedstock M1 by impact with the particles RM can be suppressed when particles RM strike the feedstock M1 while removing the color material CM.

Furthermore, even if particles RM remain in the feedstock M1, the particles RM are a material originally contained in the feedstock M1, therefore do not become an impurity, and after the color material CM is removed, the feedstock M1 can be conveniently used to remanufacture sheets as described above.

Note that the cellulose contained in the particles RM is the same as the cellulose contained in the feedstock M1 described above, may be any fibrous material containing mainly cellulose (narrowly defined cellulose) as a chemical compound, and in addition to cellulose (narrowly defined cellulose) may include hemicellulose or lignin.

The average particle diameter of the particles RM is, for example, greater than or equal to 0.1 μm and less than or equal to 50 μm. Considering that the width of cellulose fibers contained in the feedstock M1 is generally about 10 μm to 30 μm, it is difficult for particles RM greater than 50 μm to efficiently strip color material CM adhering to the surface of fibers.

On the other hand, if the size of the particles RM is too small, kinetic energy drops, and it is difficult to efficiently strip color material CM from the fibers. The cost of milling or manufacturing particles RM smaller than 0.1 μm is also high.

The moisture content of the particles RM is preferably greater than or equal to 5% and less than or equal to 20%. Because mass increases as the moisture content increases, the kinetic energy of the particles RM also increases, and the particles RM can more efficiently remove color material CM. However, if the moisture content exceeds 20%, the particles RM may clump together or stick to the inside walls of the holding tank 71 and conduit 73 (nozzle 731), interfering with efficient particle ejection.

One of the idler rollers 33 is located below the nozzle 731 with the glue belt 31 therebetween (the idler roller 33 directly below the nozzle 731 is referred to below as idler roller 33a). This idler roller 33a can support the feedstock M1 and the glue belt 31 from below. As a result, the particles RM ejected from the nozzle 731 can desirably strike the color material CM.

Embodiment 2

Figure 6:
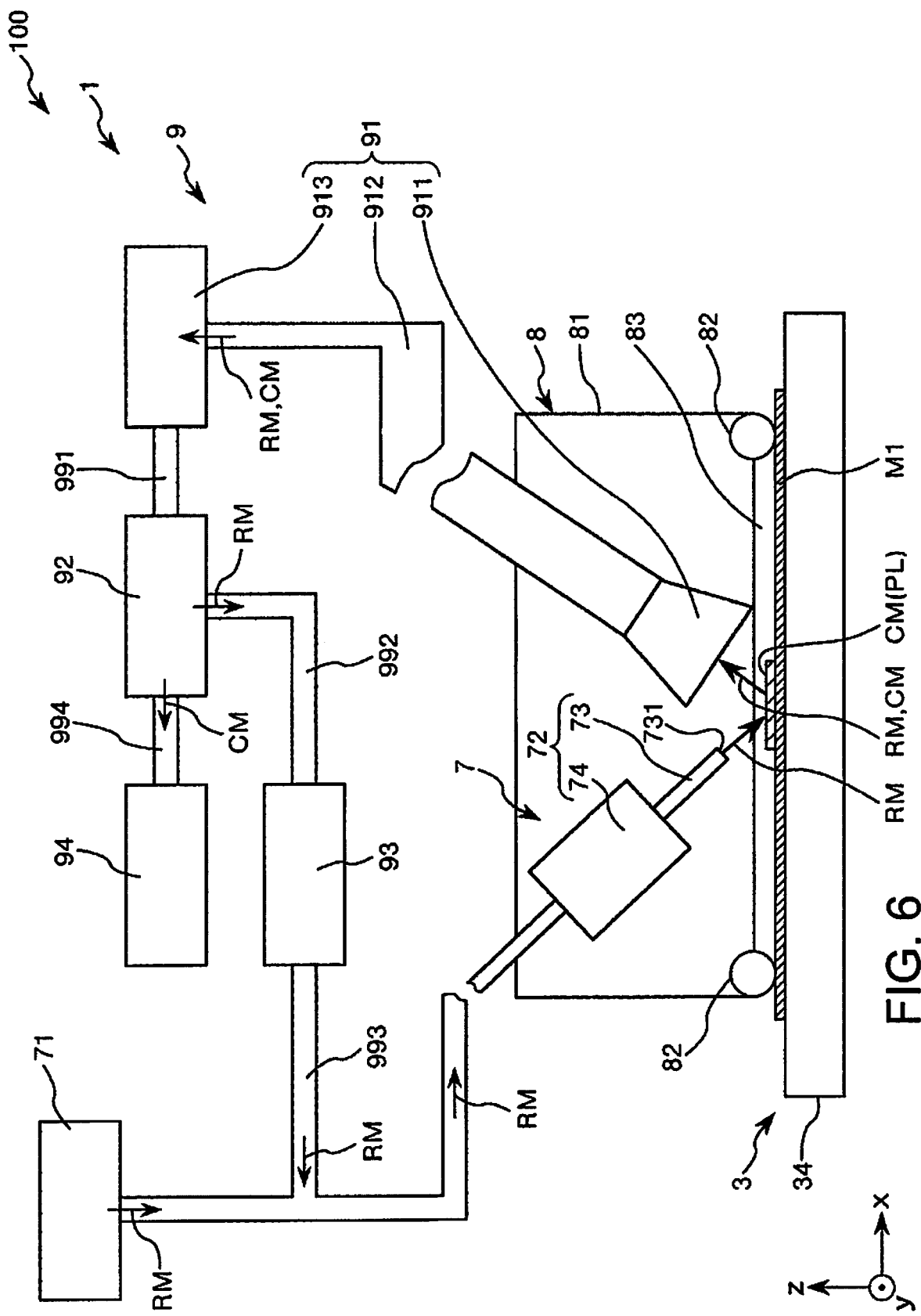
FIG. 6 is a side view schematically illustrating the configuration of the upstream side (processing device of the invention) of a sheet manufacturing apparatus according to a second embodiment of the invention.
Figure 7:
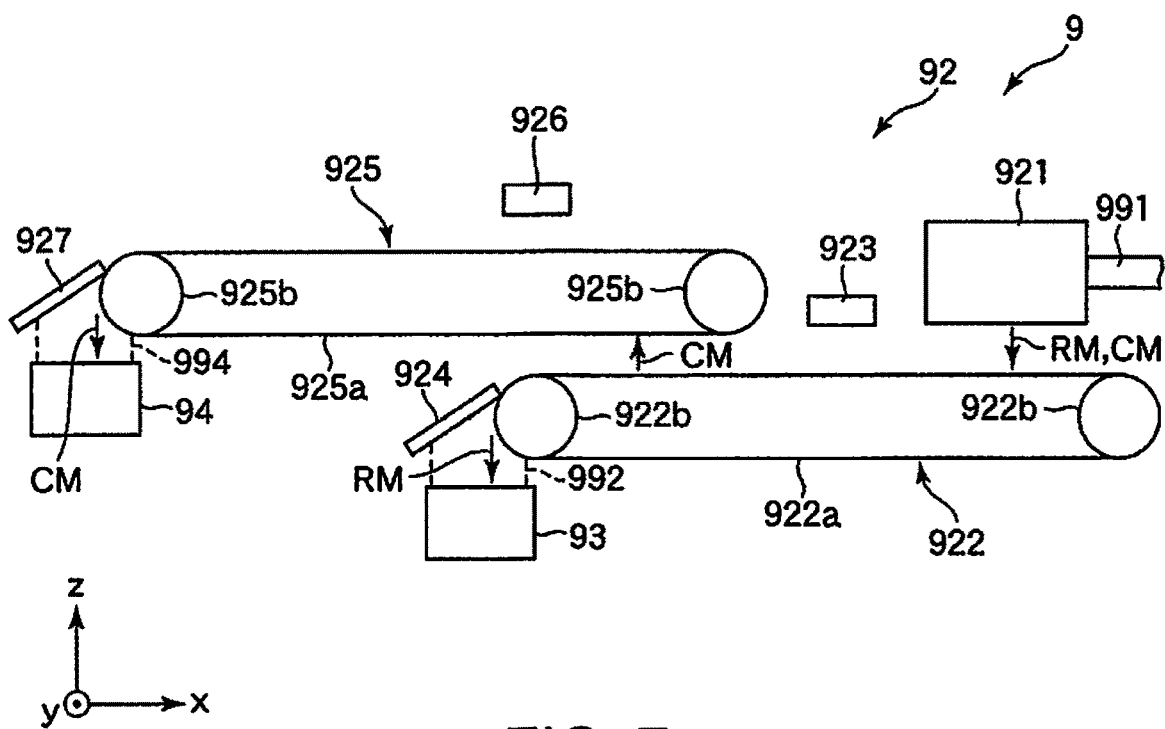
FIG. 7 is a side view schematically illustrating a separating device of the processing device shown in FIG. 6.

FIG. 6 is a side view schematically illustrating the configuration of the upstream side (processing device of the invention) of a sheet manufacturing apparatus according to a second embodiment of the invention. FIG. 7 is a side view schematically illustrating a separating device of the processing device shown in FIG. 6.

A processing device, a sheet manufacturing apparatus, a processing method, and a sheet manufacturing method according to a second embodiment of the invention are described below with reference to the accompanying figures, focusing on differences with the foregoing embodiment and omitting further description of similar configurations.

This embodiment is the same as the first embodiment described above except for the configuration of the processing device.

The conveyance mechanism 3 in the first embodiment described above is a belt conveyor, but the embodiment of the configuration shown in FIG. 6 is configured to hold the feedstock M1 by means of suction on a stage while conveying the feedstock M1, or more specifically comprises a platen 34. This platen 34 may be supported movably on both the X-axis and the Y-axis.

As shown in FIG. 6, the processing device 1 in this embodiment has an airtight housing 8, and the nozzle 731 of the color material removal device 7 is disposed inside the housing 8. This housing 8 includes a box-like case 81, and a seal 82 and another seal 83 disposed below the case 81.

The case 81 covers part of the color material removal device 7 at the distal end (the nozzle 731 end) from the blower 74.

Seals 82 are rollers that are disposed to both X-axis sides of the case 81 and rotate on the Y-axis. The other seal 83 is disposed to both Y-axis sides of the case 81, and is shaped like a belt extending on the X-axis. Seals 82 and seals 83 can contact the platen 34 and the feedstock M1 moving forward (sliding) on the X-axis. As a result, the inside of the housing 8 (case 81) can be kept airtight.

The color material CM is removed from the feedstock M1 inside the housing 8 in this configuration. As a result, the particles RM ejected from the nozzle 731 of the color material removal device 7, and color material CM removed by the particles RN, can be prevented from dispersing and soiling the surrounding area. As a result, maintenance of the inside of the processing device 1 is simplified.

Note that in this embodiment, the nozzle 731 is directed down from the upstream side, that is, at a downward right angle in FIG. 6.

The processing device 1 also has a collection unit 9. The collection unit 9 collects the particles RM and color material CM. More specifically, the collection unit 9 includes a vacuum 91, a separator 92, a particle storage tank 93, and a color material storage tank 94. The vacuum 91 and separator 92 connect through a conduit (flow path) 991. The separator 92 and particle storage tank 93 connect through another conduit (flow path) 992. The particle storage tank 93 connects through another conduit (flow path) 993 to a junction with the conduit 73 of the color material removal device 7. The separator 92 and color material storage tank 94 connect through another conduit (flow path) 994.

The collection unit 9 of the processing device 1 has a vacuum 91 that collects the particles RM and color material CM after the color material CM is removed. The vacuum 91 includes a vacuum head 911, a duct 912, and a storage tank 913.

The vacuum head 911 connects to the downstream side of the nozzle 731. The vacuum head 911 is conically shaped when seen from the side, and is directed at a downward left angle in FIG. 6 with the distal end open. As a result, particles RM used to remove color material CM, and the color material CM that was removed by the particles RM, can be collected together.

The duct 912 is a conduit connecting the vacuum head 911 to the storage tank 913. The particles RM and color material CM collected by the vacuum head 911 pass through the duct 912 and enter the storage tank 913. Note that a blower (not shown in the figure) may be connected to the duct 912. The blower produces suction in the vacuum head 911, enabling collecting the particles RM and color material CM through the vacuum head 911.

The storage tank 913 is apart that temporarily stores the particles RM and color material CM from the duct 912.

A vacuum 91 thus comprised can collect the particles RM and color material CM that is prevented from dispersing by the housing 8. As a result, particles RM and color material CM can be prevented from being left on the feedstock M1.

The collect ion unit 9 of the processing device 1 also has a separator 92 that separates the collected particles RM and color material CM. The separator 92 in this example is configured to use differences in the static charge of the color material CM and particles RM to separate the particles RM and color material CM. The separator 92 includes a discharge device 921, a conveyance device 922, a charger 923, a blade 924, another conveyance device 925, a charger 926, and a blade 927.

The discharge device 921 is a device that discharges the particles RM and color material CM conveyed thereto through conduit 991 to a conveyance device 922 therebelow.

Below the discharge device 921 is a conveyance device 922. The conveyance device 922 includes an endless belt 922a, and two tension rollers 922b on which the endless belt 922a is mounted. The particles RM and color material CM discharged from the discharge device 921 accumulate in a layer on the endless belt 922a as a result of the tension rollers 922b turning on the X-axis.

The charger 923 is a negative charger that negatively charges the particles RM and color material CM on the endless belt 922a. As a result, the particles RM and color material CM are negatively charged, but due to the properties of the color material CM, the color material CM holds a stronger negative charge than the particles RM.

Another conveyance device 925 is disposed above the conveyance device 922. The conveyance device 925 comprises an endless belt 925a, and two tension rollers 925b on which the endless belt 925a is mounted.

The charger 926 is a positive charger that positively charges the endless belt 925a. As a result, color material CM that holds a stronger negative charge than the particles RM is pulled from the one endless belt 922a to the other endless belt 925a, and more color material CM sticks to the endless belt 925a than particles RM. As a result, color material CM is removed from the endless belt 922a, leaving the particles RM.

The blade 924 touches the endless belt 922a, and wipes residual particles RM from the endless belt 922a. The removed particles RM are collected in the particle storage tank 93.

The other blade 927 contacts the endless belt 925a, and wipes color material CM from the endless belt 925a. The color material CM that is removed collects in the color material storage tank 94. The color material CM collected in the color material storage tank 94 may then be discarded.

The separator 92 thus comprised can separate particles RM that can be reused from color material CM that can be discarded.

The collection unit 9 of the processing device 1 also has a conduit 993 that returns the recovered particles RM to the conduit 73 of the color material removal device 7. As a result, particles RM that have past through the conduit 993 merge in the conduit 73 with the particles RM discharged from the holding tank 71 of the color material removal device 7. As a result, the color material removal device 7 can reuse the particles RM returned from the conduit (flow path) 993 to remove color material CM. As a result, particles RM that can be reused can be recycled and prevented from being wastefully discarded.

Note that a configuration such as a screw feeder or circle feeder that facilitates passage of the particles RM through the conduit 993 may be disposed to the conduit 993.

Embodiment 3

Figure 8:
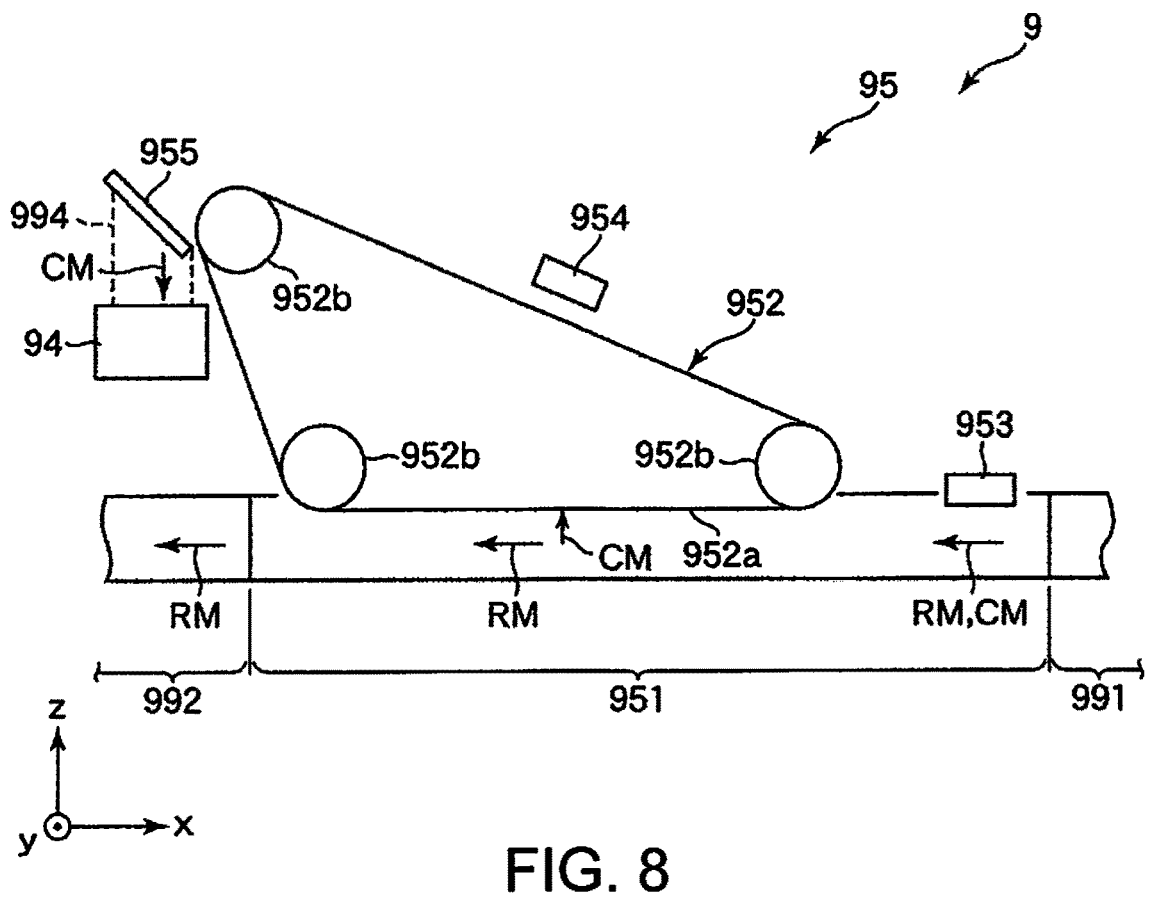
FIG. 8 is a side view schematically illustrating the configuration of the separating device of the processing device disposed on the upstream side of a sheet manufacturing apparatus according to a third embodiment of the invention.

FIG. 8 is a side view schematically illustrating the configuration of the separating device of the processing device disposed on the upstream side of a sheet manufacturing apparatus according to a third embodiment of the invention.

A processing device, a sheet manufacturing apparatus, a processing method, and a sheet manufacturing method according to a third embodiment of the invention are described below with reference to the accompanying figures, focusing on differences with the foregoing embodiments and omitting further description of similar configurations.

This embodiment is the same as the second embodiment described above except for the configuration of the separator of the collection unit.

As shown in FIG. 8, in this embodiment of the invention the separator 95 of the collection unit 9 comprises a conduit 951, a conveyance device 952, a charger 953, a charger 954, and a blade 955. The storage tank 913 is omitted in this embodiment of the invention.

The conduit 951 is a connector conduit between conduit 991 and conduit 992.

The conveyance device 952 includes an endless belt 952a of which part is exposed inside the conduit 951, and three tension rollers 952b on which the endless belt 952a is mounted.

The charger 953 is disposed on the upstream side of the conduit 951 where the endless belt 952a is exposed, and is a negative charger that negatively charges the particles RM and color material CM passing through the conduit 951. As a result, the particles RM and color material CM are both negatively charged, but due to their properties, the color material CM holds a stronger negative charge than the particles RM.

The charger 954 is a positive charger that positively charges the endless belt 925a. As a result, color material CM that holds a stronger negative charge than the particles RM is pulled to the other endless belt 952a when passing below the endless belt 952a, and more color material CM sticks to the endless belt 952a than particles RM. As a result, the particles RM pass through conduit 951 to the conduit 992.

The blade 955 touches the endless belt 952a, and wipes color material CM from the endless belt 952a. The removed color material CM is collected in the color material storage tank 94.

The separator 95 thus comprised can separate particles RM that can be reused from color material CM that can be discarded.

Embodiment 4

Figure 9:
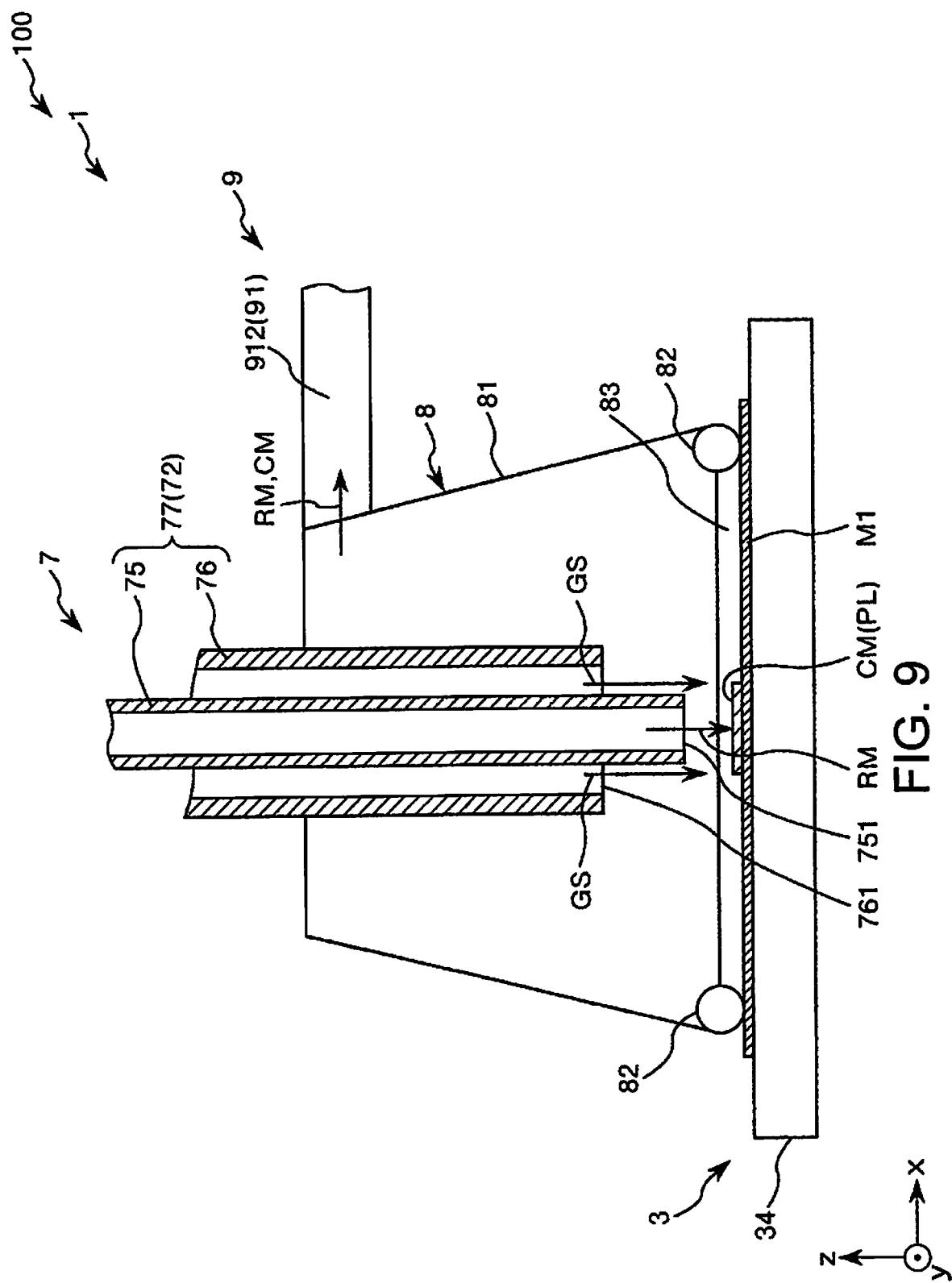
FIG. 9 is a side view schematically illustrating the configuration of the upstream side (processing device of the invention) of a sheet manufacturing apparatus according to a fourth embodiment of the invention.

FIG. 9 is a side view schematically illustrating the configuration of the upstream side (processing device of the invention) of a sheet manufacturing apparatus according to a fourth embodiment of the invention.

A processing device, a sheet manufacturing apparatus, a processing method, and a sheet manufacturing method according to a fourth embodiment of the invention are described below with reference to the accompanying figures, focusing on differences with the foregoing embodiments and omitting further description of similar configurations.

This embodiment is the same as the second embodiment described above except for the configuration of the color material removal device.

As shown in FIG. 9, the ejector 72 of the color material removal device 7 in this embodiment of the invention is a double-walled structure 77 including an internal conduit 75, and an external conduit 76 in which the internal conduit 75 is inserted.

The internal conduit 75 is a hard conduit with a nozzle 751 open in the bottom end. The external conduit 76 is a conduit of a harder material than the internal conduit 75, and the internal conduit 75 is inserted to the external conduit 76. The external conduit 76 also has a nozzle 761 open in the bottom end. The nozzle 751 of the internal conduit 75 protrudes below the bottom end of the nozzle 761 of the external conduit 76.

The double-walled structure 77 comprising an internal conduit 75 and an external conduit 76 functions as a nozzle from which particles RM are sprayed down from at least one of the nozzle 751 of the internal conduit 75 and the nozzle 761 of the external conduit 76. In this embodiment of the invention, the nozzle 751 of the internal conduit 75 functions as a nozzle from which particles RM are sprayed. The nozzle 761 of the external conduit 76 functions as an air nozzle from which air GS (gas) is sprayed in a downward direction. More specifically, air GS (gas) is sprayed down from the nozzle 761 of the external conduit 76.

The color material removal device 7 having a double-walled structure 77 configured as described above can operate in the following three states.

The first state is a state in which particles RM are discharged from the nozzle 751 of the internal conduit 75 while air GS is discharged from the nozzle 761 of the external conduit 76 as illustrated in FIG. 9. In this first state, the air GS discharged from the external conduit 76 functions as an air curtain around the particles RM discharged from the internal conduit 75. As a result, dispersion of the particles RM before the particles RM reach the recorded layer PL (color material CM) on the feedstock M1 can be prevented, and as a result causes the particles RM to strike a relatively confined area of the recorded layer PL with great force. This impact of the particles RM can quickly and efficiently remove the recorded layer PL (color material CM) from the feedstock M1. The air curtain can also prevent a drop in the discharge velocity of the particles RM.

The second state is a state in which particles RM are discharged from the nozzle 751 of the internal conduit 75 but the discharge of air GS is stopped (that is, air GS is not discharged). In this second state, the area of the recorded layer PL impacted by the particles RM is larger than an in the first state. By thus changing between discharging air GS and not discharging air GS, the area of the recorded layer PL struck by the particles RM can be adjusted.

The third state is a state in which particles RM are not discharged but air GS is discharged from the nozzle 761 of the external conduit 76. When particles RM, color material CM that was removed, or other material is left on the platen 34 after the feedstock M1 has been removed, this third state enables dispersing any remaining material and cleaning the platen 34.

Embodiment 5

Figure 10:
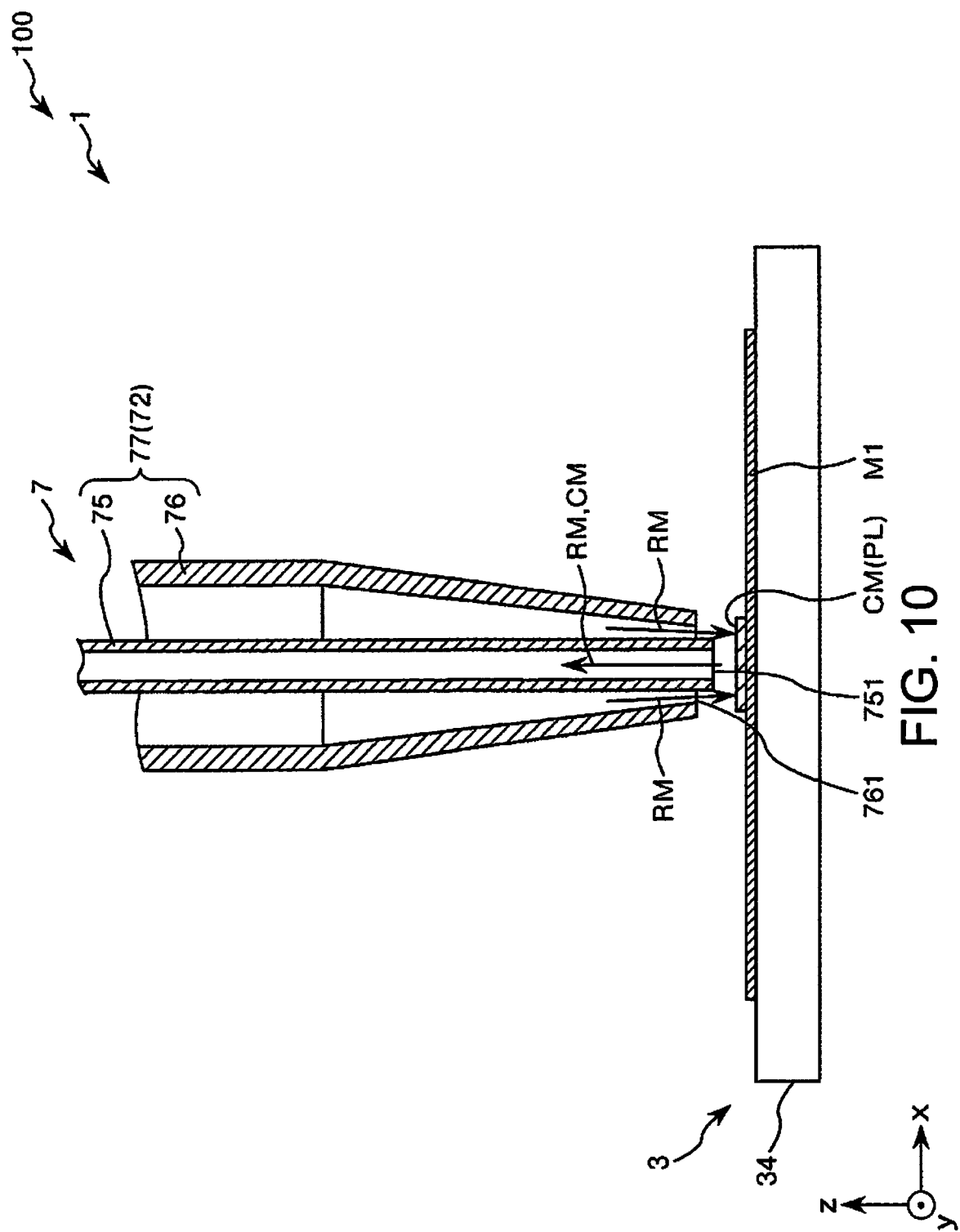
FIG. 10 is a side view schematically illustrating the configuration of the upstream side (processing device of the invention) of a sheet manufacturing apparatus according to a fifth embodiment of the invention.

FIG. 10 is a side view schematically illustrating the configuration of the upstream side (processing device of the invention) of a sheet manufacturing apparatus according to a fifth embodiment of the invention.

A processing device, a sheet manufacturing apparatus, a processing method, and a sheet manufacturing method according to a fifth embodiment of the invention are described below with reference to the accompanying figures, focusing on differences with the foregoing embodiments and omitting further description of similar configurations.

This embodiment is the same as the fourth embodiment described above except for the function of the double-walled structure of the color material removal device.

As shown in FIG. 10, in this embodiment of the invention the nozzle 761 of the external conduit 76 of the double-walled structure 77 functions as the nozzle that ejects the particles RM. The nozzle 751 of the internal conduit 75 functions as a suction nozzle that vacuums up the color material CM together with the particles RM used to remove the color material CM. In other words, the particles RM is vacuumed up together with the color material CM by the nozzle 751 of the internal conduit 75. This suctioning action can prevent dispersion of the particles RM before the particles RM reach the recorded layer PL (color material CM) on the feedstock M1, and as a result causes the particles RM to strike a relatively confined area of the recorded layer PL with great force. This impact of the particles RM can quickly and efficiently remove the recorded layer PL (color material CM) from the feedstock M1. Dispersion of the particles RM that struck the feedstock M1, and the color material CM that was removed, can also be prevented.

The internal conduit 75 is also preferably connected to the duct 912 of the collection unit 9 (not shown in FIG. 10). In this case, the particles RM and color material CM suctioned through the internal conduit 75 can be collected in the collection unit 9.

In addition, the inside diameter (and outside diameter) of the part of the external conduit 76 extending from some lengthwise point to the nozzle 761 also decreases gradually to the distal bottom end. By reducing the inside diameter, the nozzle 761 is constricted and forceful ejection of the particles RM is promoted.

Embodiment 6

Figure 11:
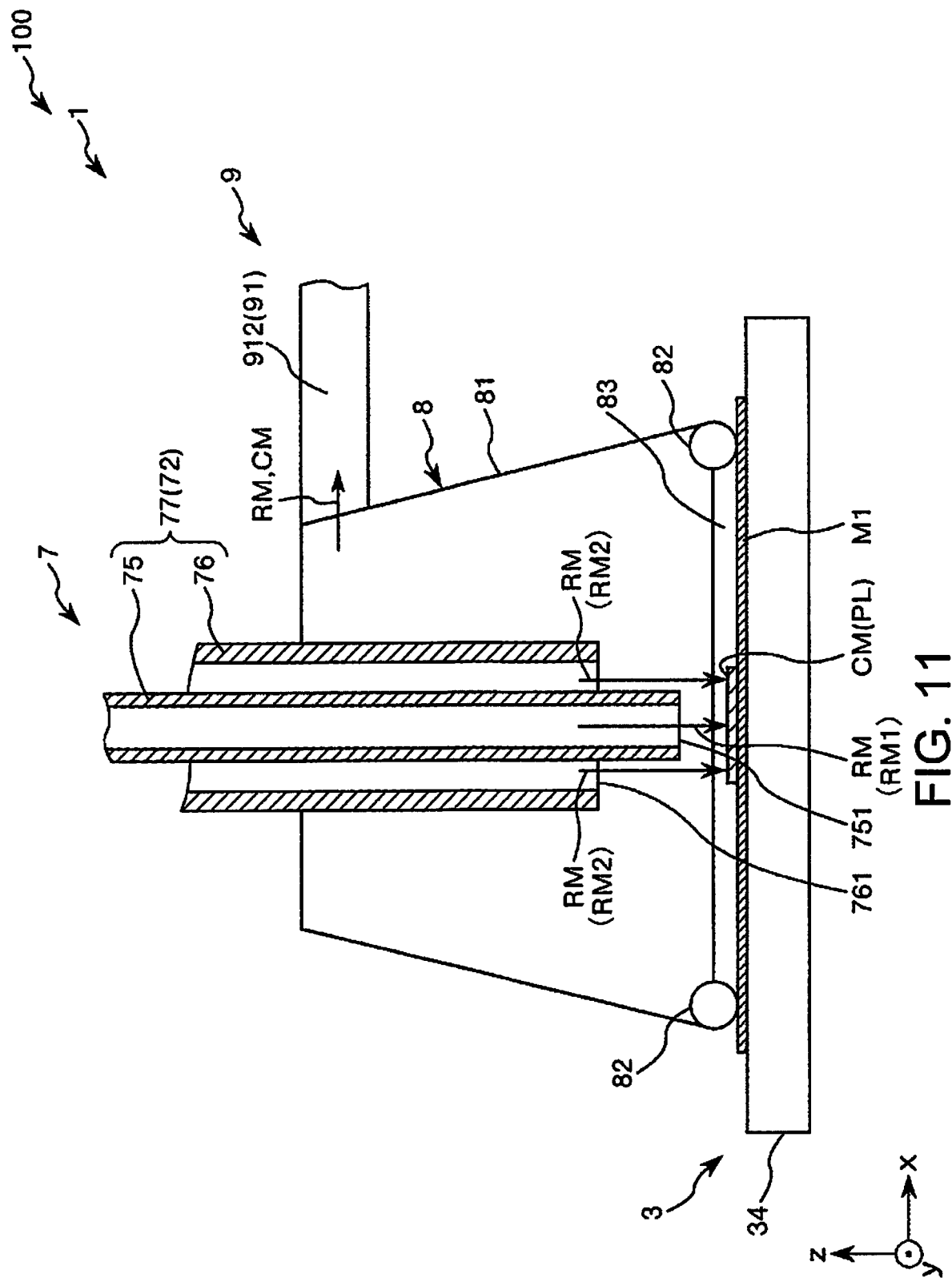
FIG. 11 is a side view schematically illustrating the configuration of the upstream side (processing device of the invention) of a sheet manufacturing apparatus according to a sixth embodiment of the invention.

FIG. 11 is a side view schematically illustrating the configuration of the upstream side (processing device of the invention) of a sheet manufacturing apparatus according to a sixth embodiment of the invention.

A processing device, a sheet manufacturing apparatus, a processing method, and a sheet manufacturing method according to a sixth embodiment of the invention are described below with reference to the accompanying figures, focusing on differences with the foregoing embodiments and omitting further description of similar configurations.

This embodiment is the same as the fourth embodiment described above except for the function of the double-walled structure of the color material removal device.

As shown in FIG. 11, in this embodiment of the invention both the nozzle 751 of the internal conduit 75 and the nozzle 761 of the external conduit 76 of the double-walled structure 77 function as nozzles that eject the particles RM. The particles RM discharged from the nozzle 751 of the internal conduit 75 (referred to below as particles RM1), and the particles RM discharged from the nozzle 761 of the external conduit 76 (referred to below as particles RM2) differ by one or both of the particle diameter and moisture content.

The internal conduit 75 is connected to a holding tank 71 (not shown in FIG. 11) storing the particles RM1, and the external conduit 76 is connected to another holding tank 71 (not shown in FIG. 11) storing the particles RM2.

The double-walled structure 77 configured as described above can operate in the following three states.

The first state is the state shown in FIG. 11 in which particles RM2 are discharged while also discharging particles RM1. The second state is a state in which particles RM1 are discharged but particles RM2 are not discharged. The third state is a state in which the particles RM1 are not discharged but the particles RM2 are discharged.

The three states can be desirably selected. As a result, when multiple types of color material CM are included in the recorded layer PL, for example, particles RM1 or particles RM2 can be discharged appropriately to the distribution of the color material CM. More specifically, when removing color material CM, particles RM1 can be discharged to those areas desirably bombarded with particles RM1, and particles RM2 can be discharged to those areas desirably bombarded with particles RM2.

Note that the particles RM1 and particles RM2 are described as two different types of particles RM that differ by a certain parameter, but the invention is not so limited and the particles RM may be the same.

Furthermore, the discharge velocity of the particles RM1 discharged from the internal conduit 75, and the discharge velocity of the particles RM2 discharged from the external conduit 76, may be the same or different. If the discharge velocities of the particles RM differ, the discharge velocity of the particles RM1 may be greater than the discharge velocity of the particles RM2, or the discharge velocity of the particles RM1 may be less than the discharge velocity of the particles RM2.

A configuration enabling adjusting the discharge velocity is also conceivable.

Embodiment 7

Figure 12:
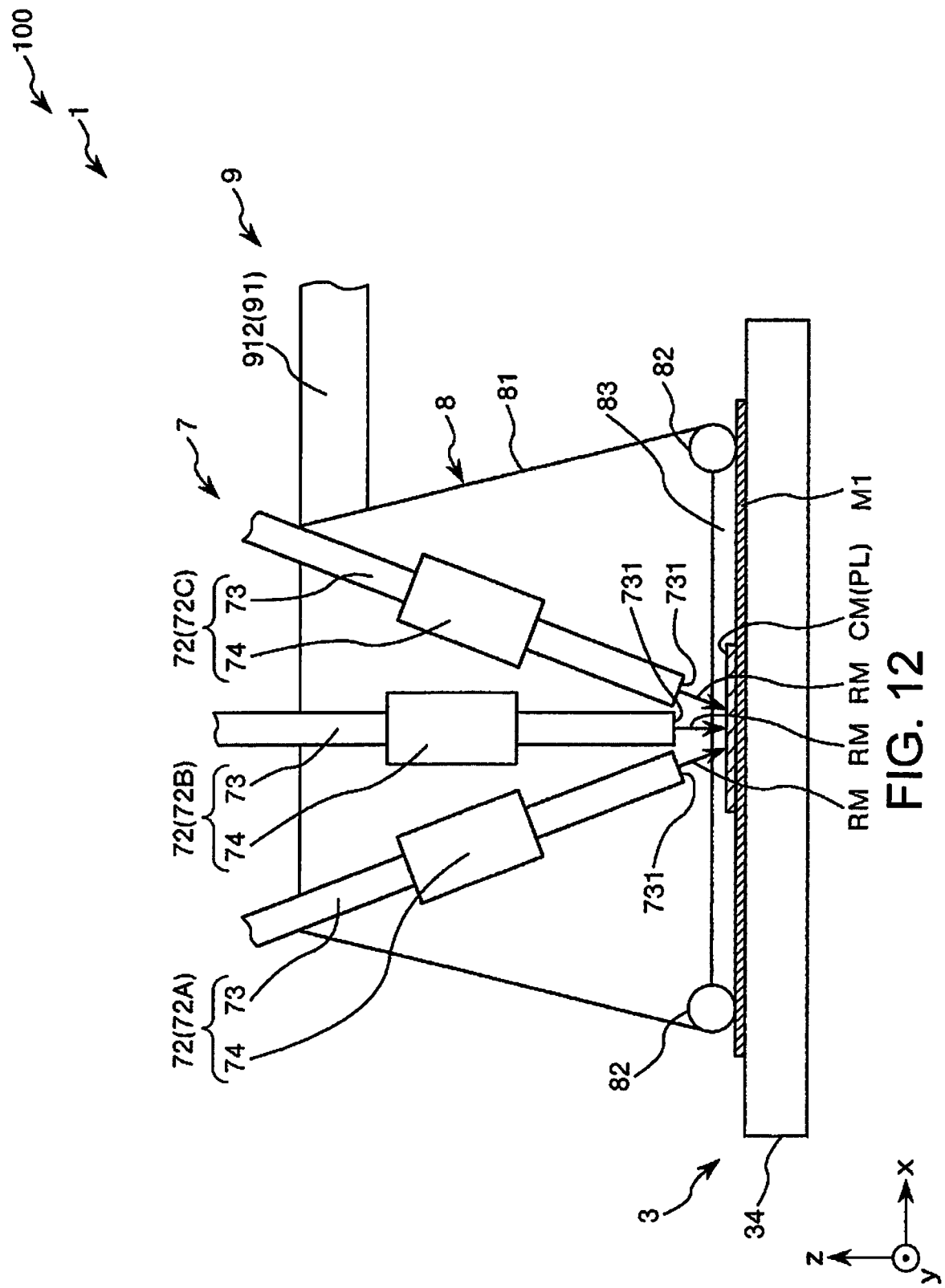
FIG. 12 is a side view schematically illustrating the configuration of the upstream side (processing device of the invention) of a sheet manufacturing apparatus according to a seventh embodiment of the invention.

FIG. 12 is a side view schematically illustrating the configuration of the upstream side (processing device of the invention) of a sheet manufacturing apparatus according to a seventh embodiment of the invention.

A processing device, a sheet manufacturing apparatus, a processing method, and a sheet manufacturing method according to a seventh embodiment of the invention are described below with reference to the accompanying figures, focusing on differences with the foregoing embodiments and omitting further description of similar configurations.

This embodiment is the same as the second embodiment described above except for the configuration of the color material removal device.

As shown in FIG. 12, the color material removal device 7 in this embodiment of the invention has three (a plurality of) ejectors 72 arrayed on the X-axis (identified below in order from the negative X-axis side as ejector 72A, ejector 72B, and ejector 72C). Ejector 72A, ejector 72B, and ejector 72C are disposed on different orientations inside the housing 8, and as a result the color material removal device 7 has three (a plurality of) nozzles 731 that discharge the particles RM from different directions.

Particles RM are discharged from the nozzle 731 of ejector 72A descending at an angle to the right as seen in FIG. 12. Particles RM are discharged from the nozzle 731 of ejector 72B descending vertically on the Z-axis as seen in FIG. 12. Particles RM are discharged from the nozzle 731 of ejector 72C descending at an angle to the left as seen in FIG. 12.

The color material removal device 7 thus comprised improves the efficiency of color material CM removal as a result of the particles RM striking the color material CM on the feedstock M1 from three different directions.

A configuration enabling adjusting the discharge velocity of the particles RM from the nozzles 731 is also conceivable.

The color material removal device 7 also enables desirably selecting which of the three ejectors 72 discharge particles RM and which ejectors 72 do not discharge particles RM to remove the color material CM.

The particles RM discharged from each of the nozzles 731 may differ by one or both of the particle diameter and moisture content. As a result, three types of particles RM that differ by at least one parameter can therefore be used to bombard the color material CM on the feedstock M1 and remove the color material CM. For example, areas that are preferably struck by particles RM of a first type discharged from ejector 72A may be bombarded by particles RM of the first type, areas that are preferably struck by particles RM of a second type discharged from ejector 72B may be bombarded by particles RM of the second type, and areas that are preferably struck by particles RM of a third type discharged from ejector 72C may be bombarded by particles RM of the third type.

Note that the arrangement of the three ejectors 72 is not limited to the arrangement shown in FIG. 12.

In addition, this embodiment describes a configuration having three ejectors 72, but the invention is not so limited and there may be only two or four or more.

Yet further, the plural ejectors 72 may include ejectors 72 that discharge the particles RM in the same direction.

Embodiment 8

Figure 13:
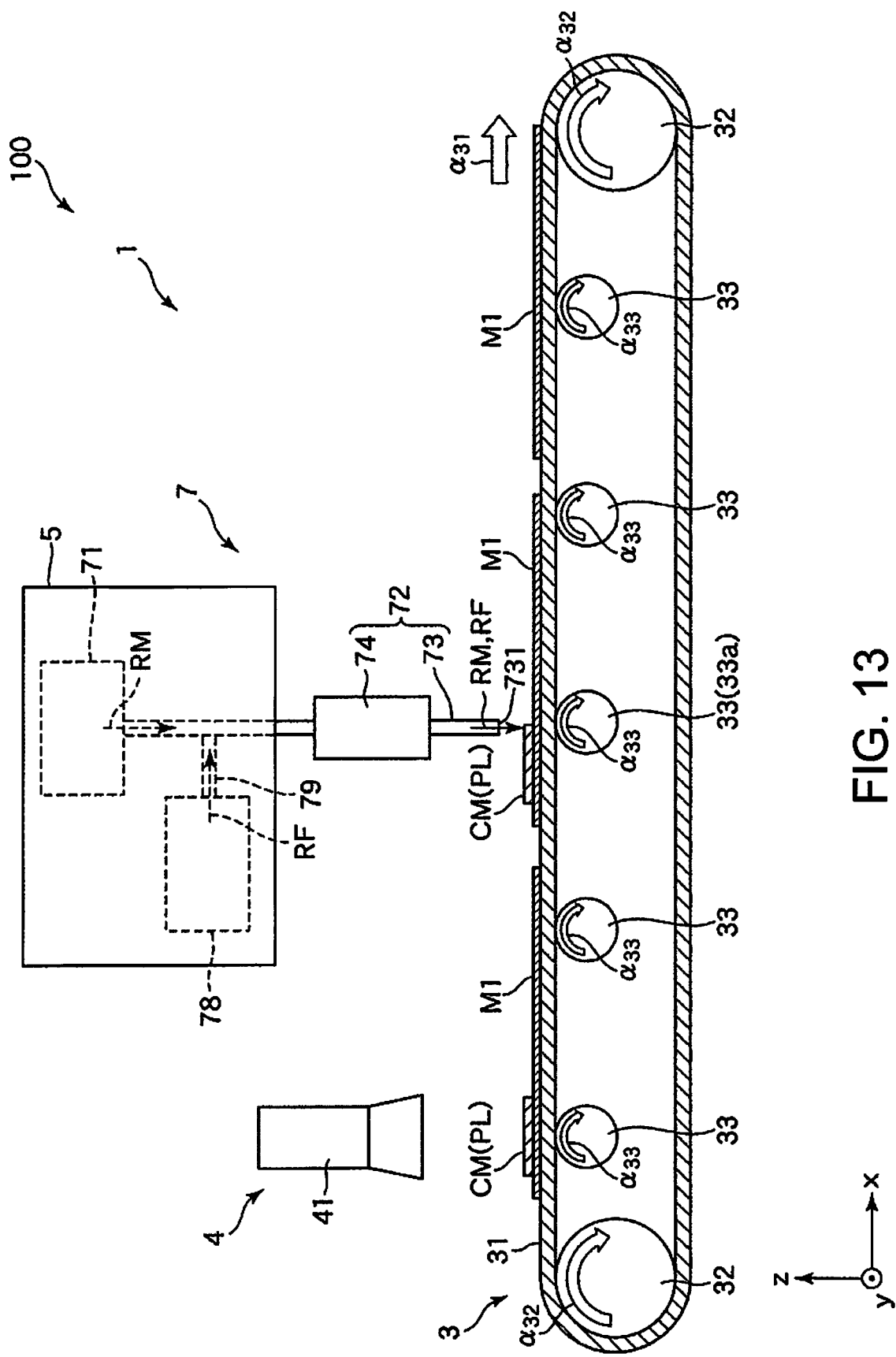
FIG. 13 is a side view schematically illustrating the configuration of the upstream side (processing device of the invention) of a sheet manufacturing apparatus according to an eighth embodiment of the invention.

FIG. 13 is a side view schematically illustrating the configuration of the upstream side (processing device of the invention) of a sheet manufacturing apparatus according to an eighth embodiment of the invention.

A processing device, a sheet manufacturing apparatus, a processing method, and a sheet manufacturing method according to an eighth embodiment of the invention are described below with reference to the accompanying figures, focusing on differences with the foregoing embodiments and omitting further description of similar configurations.

This embodiment is the same as the first embodiment described above except for the configuration of the color material removal device.

As shown in FIG. 13, the color material removal device 7 in this embodiment of the invention has a coolant storage tank 78 storing a refrigerant RF. This coolant storage tank 78 connects through a conduit 79 to the conduit 73 of an ejector 72. As a result, the color material removal device 7 is configured to discharge a refrigerant RF with the particles RM from the nozzle 731.

Heat is produced when the particles RM strike the color material CM. Depending on the amount of heat generated, this can melt the color material CM (particularly when the color material CM is toner) and result in the color material CM binding with the feedstock M1. Production of such heat can be suppressed by discharging refrigerant RF with the particles RM. As a result, the color material CM can be cooled, melting of the color material CM can be minimized, and the color material CM can therefore be efficiently removed. Cooling can also make the color material CM (resin) brittle, further improving the efficiency of color material CM removal. The difference in the coefficients of thermal expansion of the color material CM and the cellulose (fiber) in the feedstock M1 when cooled can also be used to further improve efficiency removing color material CM.

The refrigerant RF is not specifically limited, and may be particles (a powder) of ice or dry ice. Note that dry ice is carbon dioxide in solid form.

Note also that the color material removal device 7 can switch between discharging and not discharging refrigerant RF.

Note also that discharge of refrigerant RF can also be applied to the sixth embodiment and seventh embodiment described above.

Preferred embodiments of a processing device, a sheet manufacturing apparatus, a processing method, and a sheet manufacturing method according to the invention are described above, but the invention is not so limited. Parts of the processing device and sheet manufacturing apparatus may also replaced with equivalent configurations having the same function. Other configurations may also be added as desired.

Furthermore, the processing device, sheet manufacturing apparatus, processing method, and sheet manufacturing method of the invention may also be embodied by any two or more configurations (features) described herein.

The device that moves the nozzles of the color material removal device and the feedstock (substrate) relatively to each other includes a conveyance device and Y-axis moving mechanism in the embodiment described above, but the invention is not so limited. For example, the color material removal device may be supported to move independently on the X-axis and the Y-axis.

The controller may also connect to another communication device through a network. The other communication device is not specifically limited, and may be a personal computer, digital camera, smartphone, or tablet computer, for example.

Note also that the sheet manufacturing apparatus may be configured without the configuration on the downstream side in FIG. 4. In this case, the feedstock from which color material was removed by the processing device is used as is without further processing, that is, the feedstock can be used for printing again.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2017-085121, filed Apr. 24, 2017 is expressly incorporated by reference herein.

What is claimed is:

1. A processing device comprising:
   a color material removal device having at least one discharge nozzle configured to discharge particles each of which is greater than or equal to 0.1 µm and less than or equal to 50 µm and contains cellulose to a recovered paper containing cellulose and color material to remove the color material from the recovered paper, the color material being toner, ink, dyes, or pigments; and
   a color material detector configured to detect the color material on the recovered paper.

2. The processing device described in claim 1, wherein:
   the color material removal device is a double-walled conduit construction having an internal conduit and an external conduit in which the internal conduit is inserted, at least one of an opening to the internal conduit and an opening to the external conduit functioning as the discharge nozzle.

3. The processing device described in claim 2, wherein:
   an opening to the internal conduit functions as the discharge nozzle; and
   a gas is discharged from an opening to the external conduit.

4. The processing device described in claim 2, wherein:
   an opening to the external conduit functions as the discharge nozzle; and
   the particles are suctioned by the opening in the internal conduit.

5. The processing device described in claim 2, wherein:
   an opening to the internal conduit and an opening to the external conduit both function as the discharge nozzle.

6. The processing device described in claim 1, wherein:
   the color material removal device has a plurality of discharge nozzles discharging the particles in different directions.

7. The processing device described in claim 6, wherein:
   the particles discharged from the nozzles differ by at least one of particle diameter and moisture content.

8. The processing device described in claim 1, further comprising:
   a housing configured to be kept airtight and having the discharge nozzle disposed inside the housing;
   the color material being removed inside the housing.

9. The processing device described in claim 1, wherein:
the average diameter of the particles is greater than or equal to 0.1 µm and less than or equal to 50 µm.

10. The processing device described in claim 1, wherein:
the moisture content of the particles is greater than or equal to 5% and less than or equal to 20%.

11. The processing device described in claim 1, further comprising:
a moving device configured to move the discharge nozzle and the recovered paper relative to each other.

12. The processing device described in claim 1, further comprising:
a collection device configured to collect the particles and the color material after the color material is removed.

13. The processing device described in claim 12, further comprising:
a separator configured to separate the collected particles and the color material.

14. The processing device described in claim 13, further comprising:
a flow path configured to return the collected particles to the color material removal device;
the color material removal device reusing the particles returned from the flow path to remove the color material.

15. The processing device described in claim 1, wherein:
the color material removal device is configured to discharge a coolant with the particles.

16. The processing device described in claim 1, further comprising:
an ejection area decision device configured to determine, based on a detection result from the color material detector, an area on the recovered paper to which to discharge the particles.

17. A sheet manufacturing apparatus comprising a processing device described in claim 1.

18. A processing method comprising:
a color material removal process of discharging particles each of which is greater than or equal to 0.1 µm and less than or equal to 50 µm and contains cellulose to a recovered paper containing cellulose and a color material, and removing the color material from the recovered paper, the color material being toner, ink, dyes, or pigments.

19. A sheet manufacturing method comprising:
a color material removal process of discharging particles containing cellulose to a substrate holding a color material, and removing the color material from the substrate, the color material being toner, ink, dyes, or pigments; and
manufacturing a sheet from the substrate after the color material is removed.

* * * * *